United States Patent [19]
Bech et al.

[11] Patent Number: 5,993,865
[45] Date of Patent: Nov. 30, 1999

[54] BEVERAGE AND A METHOD OF PREPARING IT

[75] Inventors: Lene Mølskov Bech, Smørum; Steen Bech Sørensen, Solrød Strand; Pia Vaag, Lyngby; Marianne Muldbjerg, Copenhagen; Thorkild Beenfeldt, Glostrup; Robert Leah, Birkerød; Klaus Breddam, Glostrup, all of Denmark

[73] Assignee: Carlsberg A/S, Copenhagen, Denmark

[21] Appl. No.: 08/640,847

[22] PCT Filed: Nov. 8, 1994

[86] PCT No.: PCT/DK94/00420

§ 371 Date: Jun. 26, 1996

§ 102(e) Date: Jun. 26, 1996

[87] PCT Pub. No.: WO95/13359

PCT Pub. Date: May 18, 1995

[30] Foreign Application Priority Data

Nov. 8, 1993 [DK] Denmark ............................ 1266/93

[51] Int. Cl.$^6$ ............................ C12C 11/00; C12C 7/00; C12C 5/02; C12C 1/00
[52] U.S. Cl. ............................ 426/16; 426/11; 426/12; 426/15; 426/28; 426/29; 426/592; 426/600
[58] Field of Search ............................ 426/16, 11, 12, 426/18, 20, 21, 28, 29, 592, 600

[56] References Cited

FOREIGN PATENT DOCUMENTS

| 2148322 | 5/1985 | United Kingdom . |
| 93/15181 | 8/1993 | WIPO . |

OTHER PUBLICATIONS

European Brewery Convention, Analytica–EBC, Fourth Edition (1987), pp. E59–E60.

Clark, David C., et al. "The Protection of Beer Foam Against Lipid–Induced Destabilization." European Brewery Convention, Foam Sub–Group, (Nov. 1992), pp. 70–78.

Yokoi, S., et al. "Characterization of Beer proteins Responsible for the Foam of Beer." EBC Congress, (1989).

Asano, K., et al. "Isolation and Characterization of Foaming Proteins of Beer." ASBC Journal, vol. 38, No. 4 (1980), pp. 129–137.

Slack, P. T., et al. "The fractionation of Polypeptides from barley and beer by hydrophobic interaction chromatography: the influence of their hydrophobicity on foam stability." J. Inst. Brew., vol. 89, (1983), pp. 397–401.

Coghlan, D. St. John, et al., "Polypeptides with enhanced foam potential." J. Inst. Brew., vol. 98, (1992), pp. 207–213.

Slack et al. 1983 J Inst Brew 89 (6) pp. 397–401, Nov. 1983.

Coghlan et al. 1992 J Inst Brew. 98 (3) pp. 207–214, May 1992.

Sorenson et al. 1993 Tech Q Master Brew Assoc Am. 30 (4) pp. 136–145, Jan. 1993.

Lusk et al. 1995 J Am Soc Brew Chem 53 (3) pp. 93–103, Mar. 1995.

*Primary Examiner*—Frank C. Eisenschenk
*Assistant Examiner*—Mary K. Zeman
*Attorney, Agent, or Firm*—Ladas & Parry

[57] ABSTRACT

The present invention concerns a beverage containing proteins and/or peptides and is characterized in that it contains Cereal-LT and/or homologues as herein defined and/or a modified Cereal-LTP fraction obtainable from the Cereal-LTP and/or homologues by heating, boiling and/or mashing the Cereal-LTP and/or homologues in water at a pH between 3 and 7. The invention also concerns a method for preparing it and a use of a foam-forming additive.

38 Claims, 13 Drawing Sheets

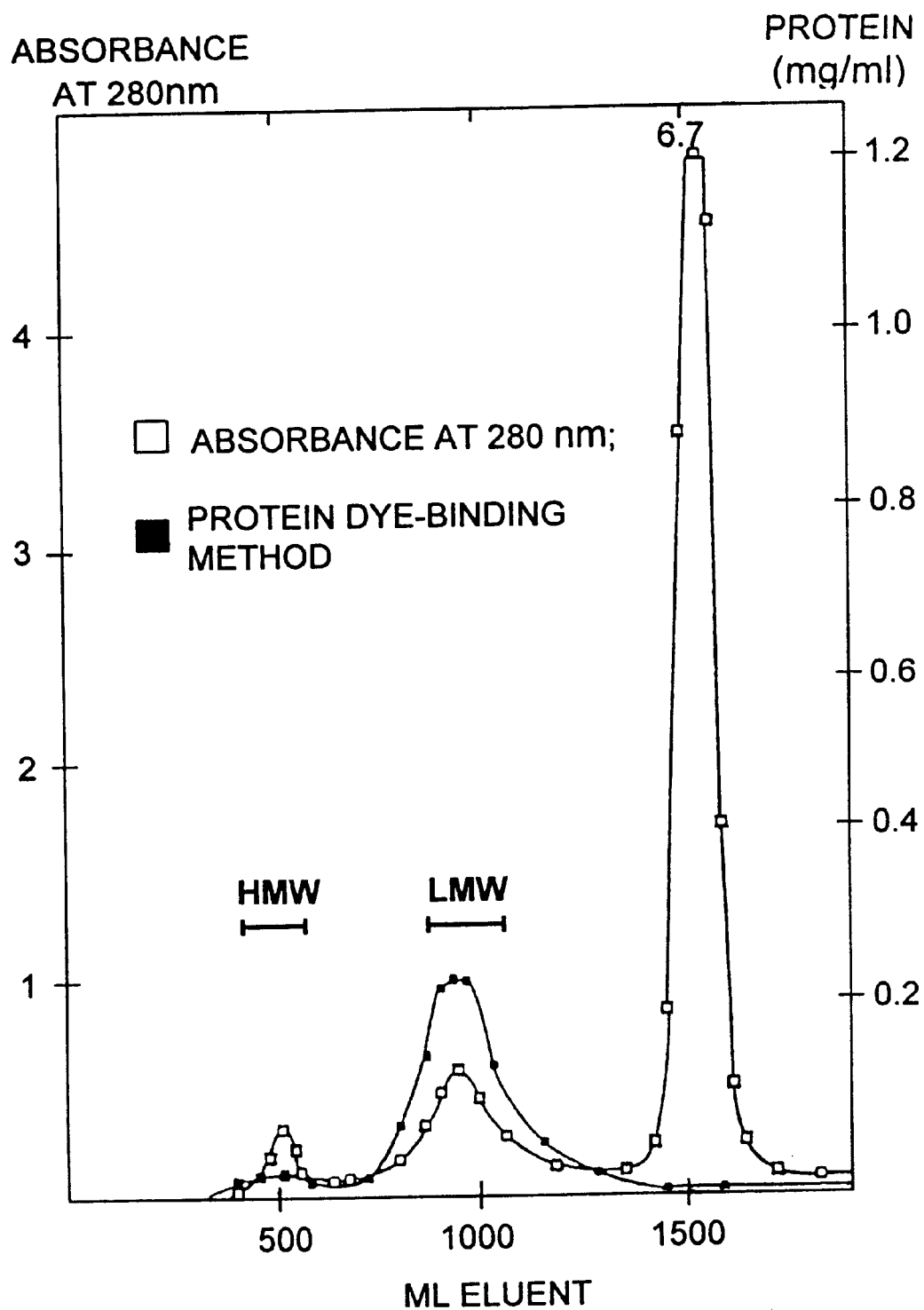
F I G. 2

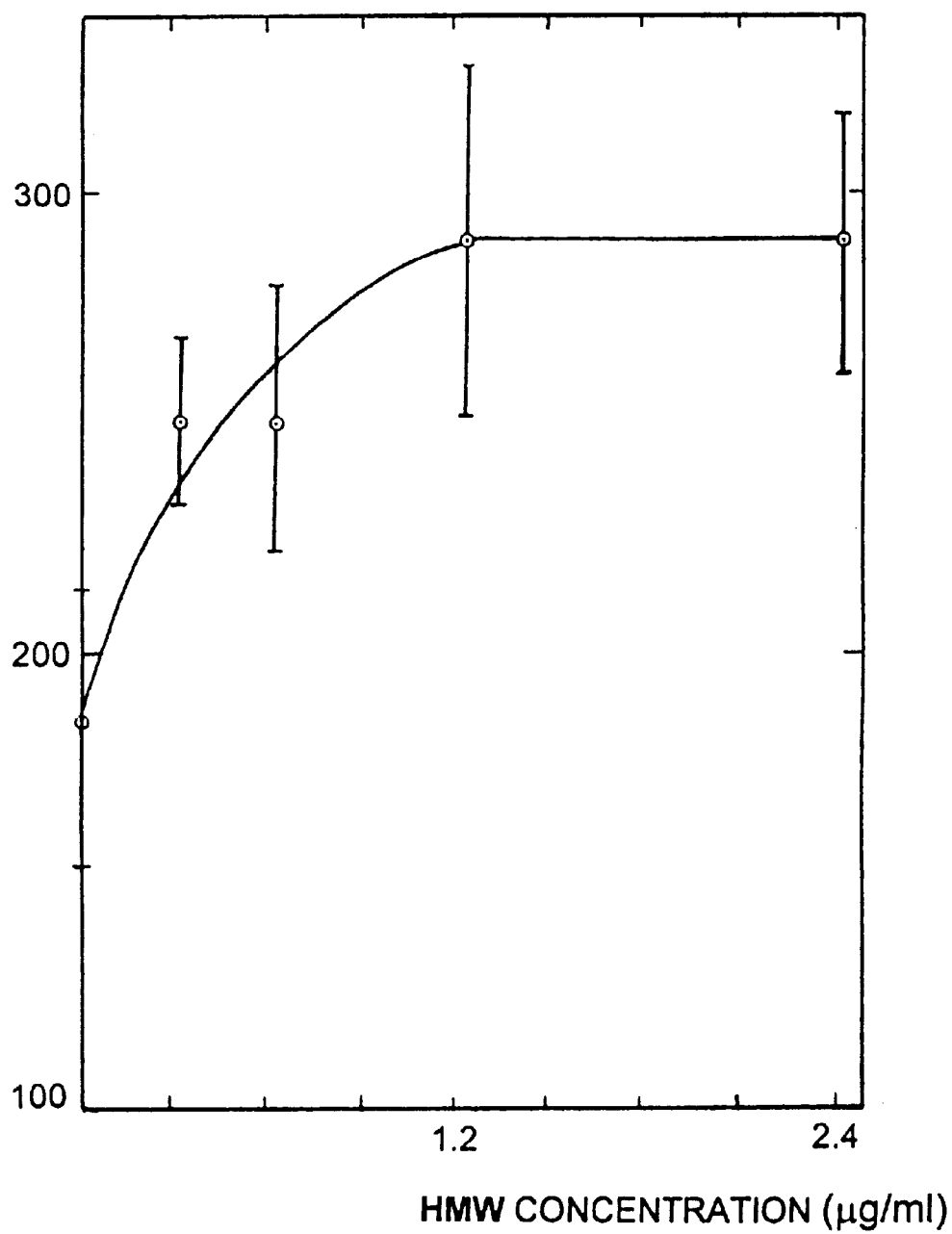
F I G. 4

BEVERAGE AND A METHOD OF PREPARING IT

The present invention relates to a foaming beverage, such as beer, a method for producing a foaming beverage and a use of a foam forming additive.

Beverages play an important role in our daily life, not only as a necessary liquid and nourishment supply, but also as a stimulant. Besides taste, texture properties such as viscosity and foam properties are important for high quality beverages.

Today a number of foaming beverages is available on the market, e.g. beer, milk shake and some soft drinks. However, there is a need for new foaming beverages as well as a need for improving the quality of the known foaming beverages.

A lot of efforts have been made to investigate and isolate the foam forming agents in beer and to improve the foaming property of beer.

For more than 50 years it has been known that the foaming properties of beer are governed by its protein content, which is around 3–4 mg/ml in a typical beer, and that free lipids and detergent residues may be detrimental to the beer foam stability.

Numerous investigations (Refs. 1,2,4,17) have dealt with the clarification of which proteinaceous components in beer are involved in foam stabilization without resulting in an unequivocal answer to this question. Several molecular weight classes of proteins in beer have been suggested to be important to the foam (Refs. 2,11,20).

The molecular weight profile of beer proteins ranges from small polypeptides to above 150,000 Dalton. Altogether, beer proteins having molecular weights up to about 100,000 Dalton have been found to have positive effect on the stabilization of beer foam, whereas small polypeptides, in particular polypeptides having a molecular weight below 5,000 Dalton, are considered to have a negative effect on foam (6,19). Furthermore, investigations by Sharpe et al. (15) proposed that the foam stability of beer was related to the ratio of high and low molecular weight polypeptides. Considering the importance of specific proteins, Yokoi et al. (Ref. 20) stated that protein Z, a 40,000 Dalton barley albumin, played the most important role in foam stability. This is contrary to the results of Hollemans and Tonies (Ref. 11) who showed that complete and selective removal of this protein from beer by specific, immobilized antibodies had only a minor effect on the foam stability.

High molecular weight components originating from the yeast and mainly of carbohydrate nature have also been found to be concentrated in beer foam (Refs. 10,12).

Most of the above-mentioned conclusions have been reached from fractionation of beer proteins and determination of the ability of the different fractions to generate stable foam. None of the investigations have taken any steps to improve the quality of beer foam.

When discussing foam quality, there are two important parameters, viz. the ability to form foam and the ability to stabilize the foam.

It has now surprisingly been found that a particular group of proteins designated as Cereal-LTP has the ability to form foam in beverages.

The present invention therefore concerns a beverage containing protein and/or peptides which are characterized by the features of claim 1

Cereal-LTP means proteins or peptides from cereals classfied as Lipid Transfer Proteins. Table I shows the sequence of a number of such Cereal-LTP and other plant LTP. These proteins are further described by Molina et al. (ref. 13).

Homologues mean proteins with 50–110 amino acids and particularly 80–100 amino acids and with at least 60%, preferably 80% or more sequence homology with a Cereal-LTP.

Particularly the structural relationship is important. The homologous proteins therefore preferably comprise at least 6 cystein groups and preferably 8 cystein groups to build up 3 or 4 disulfide bridges.

Preferred homologous proteins are TLTP, SLTP, CLTP, CB-A, CB-B and CB-C.

In the present invention cereal-seeds-LTP is preferred.

A particularly preferred Cereal-LTP is barley-LTP from barley seeds, in Table I designated BLTP and also designated LTP1 in the examples.

BLTP is a basic protein abundant in the aleurone layer of barley seeds (Refs. 14,16). It has a molecular weight of 9.694 Dalton comprising 91 amino acid residues including 8 cysteines (Ref. 18). The amino acid sequence has been determined (Ref. 18). It has been cloned and the nucleotide sequence of a cDNA has been determined (Ref. 14).

In the following description of the invention the term Cereal-LTP or subgroups of this, such as barley-LTP, also designates the homologues as defined above with a sequence homology to the mentioned LTP group. Further, the term Cereal-LTP or subgroups of this designates modified Cereal-LTP fraction obtainable from the mentioned LTP or homologues thereof by heating, boiling and/or mashing the LTP. Preferably, the Cereal-LTP is not completely denatured, i.e. some structures are present because of the ability of cysteins to form disulfide bridges.

When Cereal-LTP is subjected to heating, boiling and/or a mashing step as described later on and as is normal in a beer brewing process, it maintains substantially all of its primary sequence, whereas the secondary and tertiary structures change more or less and some or all of the disulfide bridges may rearrange. In the brewing process the methionine amino acid of the barley LTP1 is often oxidized. The inventors of the present invention have also observed the formation of LTP-dimers and -oligomers, probably via rearrangement of one or several of the disulfide bridges present in LTP. As described later on LTP may also combine with other components present under a boiling step, e.g. hordein fragments, hops and lipids.

TABLE 1

Alignment of the amino acid sequences of plant lipid transfer proteins

BLTP: -LNCGQVDSKMKPCLTYV--QGGPGPSGECCNGVRDLHQAQSSGDRQTVCLC-
(LTP1)    (SEQ ID NO: 1)              (SEQ ID NO: 2)
         LKGIARGIHNLNLNNAASIPSKCNVNVPYTISDIDCSRIY
            (SEQ ID NO: 3)
WLTP: -IDCGHVDSLVRPCLSYV--QGGPGPSGQCCDGVKNLHNQARSQSDRQSACNC-

TABLE 1-continued

Alignment of the amino acid sequences of plant lipid transfer proteins

```
            (SEQ ID NO: 4)           (SEQ ID NO: 5)
            LKGIARGIHNLNEDNARSIPPKCGVNLPYTISLNIDCSRV
                (SEQ ID NO: 6)
MLTP:   ALSCGQVASAIPCISYA-RGQGSGPSAGCCSGVRSLNNAARTTADRRAACNC-
            (SEQ ID NO: 7)           (SEQ ID NO: 8)
            LKNAAAGVSGLNAGNAASIPSKCGVSIPYTISTSTDCSRVN
                (SEQ ID NO: 9)
RiLTP:  -ITCGQVNSAVGPCLTYA-RG-GAGPSAACCSGVRSLKAAASTTADRRTACNC-
            (SEQ ID NO: 10)          (SEQ ID NO: 11)
            LKNAARGIKGLNAGNAASIPSKCGVSPYTISASIDCSRVS
                (SEQ ID NO: 12)
RaLTP:  AISCGQVSSAIGPCLAYA-
            (SEQ ID NO: 13)
            RGAGAAPSASCQSGVRSLNAAARTTADRRAAACNCSLKSAASRVSGLNAGKASSIPRCGVRLPYAISASIDCSRVNN
                (SEQ ID NO: 14)
Cw18:   AITCGQVSSALGPCAAYA-KGSGTSPSAGCCSGVKRLAGLARSTADKQATCRC-
            (SEQ ID NO:15)           (SEQ ID NO: 16)
            LKSVAGAY---NAGRAAGIPSRCGVSVPYTISASVDCSKIH
            (SEQ ID NO: 17)          (SEQ ID NO: 18)
Cw21:   AISCGQVSSALSPCISYA-RGNGAKPPAACCSGVKRLAGAAQSTADKQAACKC-
            (SEQ ID NO: 19)          (SEQ ID NO: 20)
            IKSAAGGL---NAGKAAGIPSMCGVSVPYAISASVDCSKIR
            (SEQ ID NO: 21)          (SEQ ID NO: 22)
CB-A:   -VDCGQVNSSLASCIPFL-TGGVASPSASCCAGVNLKTLAPSADRRAACEC-
            (SEQ ID NO: 23)          (SEQ ID NO: 24)
            IKAAAARFPTIKGDAASSLPKKCGVDINIPISKTTNCQAIN
                (SEQ ID NO: 25)
CB-B:   -VNCGQVNKALSSCVPFL-TGFDTTPSLTCCAGVMLLKRLAPTVKDKRIACEC-
            (SEQ ID NO: 26)          (SEQ ID NO: 27)
            VKTAAARYPNIREDAASSLPYKCGVVINVPISKTTNCHEIN
                (SEQ ID NO: 28)
CB-C:   AVPCSTVDMKAAACVGFA-TGKDSKPSQACCTGLQQLAQTVKTVDDKKAICRC-LK-
            (SEQ II. NO: 29)         (SEQ ID NO: 30)
            ASSKSLGIKDQFLSKIPAACNIKVGFPVSTNTNCETIH
                (SEQ ID NO: 31)
TLTP:   ALTCGQVTAGLAPCLPYL-OGRGP--LGGCCGGVKNLLGSAKTTADRKTACTC-
            (SEQ ID NO: 32)      (SEQ ID         (SEQ ID NO: 34)
                                 NO: 33)
            LKSAANAIKGIDLNKAAGIPSVCKVNIPYKISPSTDCSTVQ
                (SEQ ID NO: 35)
SLTP:   GITCGMVSSKLAPCICGYL-KGGP--LGGGCCGGIKALNAAAATTPDRKTACNC-
            (SEQ ID NO: 36)      (SEQ ID         (SEQ ID NO: 38)
                                 NO: 37)
            LKSAANAIKGINYGKAAGLPGMCGVHIPYAISPSTNCNAVH
                (SEQ ID NO: 39)
CLTP:   VLTCGQVTGALAPCLGYLSRQVNVPVPLTCCNVVRGLNNAARTTLDKRTACGC-
            (SEQ ID NO: 40)
            LKQTANAVTGLNLAAAGLPARCGVNIPYKISPTTDCNRVV
                (SEQ ID NO: 41)
```

Gaps (-) are introduced to show the homology.
BLTP designates LTP from barley seeds.
WLTP designates LTP from wheat.
MLTP designates LTP from maize.
RiLTP designates LTP from rice seeds.
RaLTP designates LTP from Indian finger millet (ragi).
Cw18 designates LTP from barley leaves.
Cw21 designates LTP from harley leaves.
CB-A designates LTP from castor beans.
CB-B designates LTP from castor beans.
CB-C designates LTP from castor beans.
TLTP designates LTP from tomato.
SLTP designates LTP from spinach.
CLTP designates LTP from carrots.

The modified Cereal-LTP can preferably be obtained by heating the ordinary Cereal-LTP in an aqueous solution for a period of time of up to 3 h at a temperature between 50 and 95° C. or by boiling at atmospheric pressure for up to 2 h and/or mashing as an ordinary step of mashing in beer production.

In the following the term "Cereal-LTP" also designates homologues thereof or modified Cereal-LTP and modified homologues unless otherwise stated.

The beverage can be any drinkable liquid such as milk-based and fruit-based beverages and beer.

As a small amount, i.e. about 50 mg/l, is present in known beers, this prior art is disclaimed in claim 1.

Beer production or the brewing process as it is known from the prior art is described in detail in literature such as Malting and Brewing Science, Volume I, D. E. Briggs, J. S. Hough, R. Stevens and T. W. Young. Chapman and Hall, London (1981) and Volume II, J. S. Hough, D. E. Briggs, R. Stevens and T. W. Young. Chapman and Hall (1982)

describe many variations of raw materials and processes. Generally, the processes follow steps A)–D).

A) Selection of raw materials and preparation

The raw materials contain:

Water; carbohydrates and proteins (present in cereals like barley, wheat, rice, maize, sorghum); sugar; syrups; malt extracts; enzymes formed during the malting process of cereals (i.e. barley and wheat) or microbiological production; flavour components (roasted malt, hops and other plant materials or juices).

The cereal raw materials may be:

Malted; milled; separated (to generate components with specific flavour and enzyme activates).

B) Mashing and wort production

Comprising:

Extracting by controlled soaking (temperature and time) of the prepared raw materials; boiling and separation of wort from insoluble materials.

C) Fermentation of wort

Fermentation takes place after a yeast suspension has been added to the cold aerated wort. During controlled temperature conditions yeast metabolisms (fermentation) will convert wort into beer comprising certain yeast produced components such as alcohol and flavour components. This step can be controlled by the process parameters: Temperature and yeast dosage as well as yeast breeding.

D) Clarification and finishing

After storage and maturation the remaining yeast and protein/tannin sediments are filtered, carbondioxide, colour and other corrective additions like stabilizing and flavour components are implemented.

It is general knowledge to brewers that beer produced only on malted barley or malted wheat generates foam with higher potential (ability to form foam) and better stability than beer brewed with adjuncts.

Analyses of the content of Cereal-LTP in prior art beer with the highest known foam potential show that the Cereal-LTP concentration is far less than 300 mg/l.

The quality of beer foam depends both on the brewing process and the raw material used. As the present invention essentially relates to the raw materials, the content of Cereal-LTP in beer, next to the original gravity, is mostly related to the Cereal-LTP in wort made according to the EBC (European Brewery Convention) standard mashing method, also designated congress wort. For unmalted cereals a similar extraction procedure can be used, if necessary by including addition of normal levels of brewing enzyme activity.

The Cereal-LTP being present in known sweet wort intended for production of beer is primarily LTP1 or slightly modified LTP1. The modification degree depends on the process according to which it is made. When the congress wort is made according to the EBC standard mashing method, about 90% of the Cereal-LTP being present in the congress wort is measured by an ELISA using antibodies raised against unmodified LTP1, when the ELISA is performed according to standard procedures as described later on.

The concentration of Cereal-LTP in known beer is less than X and far less than X1, where X and X1 designate levels obtainable in beer brewed on raw materials which by use of the EBC standard mashing method gives congress wort having a concentration of Cereal-LTP corresponding to 125 µg/ml and 150 µg/ml, respectively, of Cereal-LTP measured by an ELISA using antibodies raised against unmodified LTP1.

The term "first wort" designates the wort obtained in a first filtration step after the mashing step. The first filtration step is the ordinary filtration step before washing the filter cake.

The term "sweet wort" designates the wort obtained after the final filtration step, i.e. after the filter cake has been washed with water. The sweet wort is therefore a mixture of the first wort and the washing water.

The term "congress wort" designates a wort made according to the EBC standard mashing method.

The term "wort" designates the final wort after mashing, filtration and boiling.

Primarily, all Cereal-LTP present in wort may be found in the beer made from this. 1 ml of wort normally gives about 1 to 2 ml beer.

This means that a wort with a Cereal-LTP concentration of 125 µg/ml may give a beer with a Cereal-LTP concentration of up to 125 µg/ml.

The EBC standard mashing method is described in detail in "ANALYTICA-EBC", fourth edition, 1987, page E59, published by Brauerei und Getranke-Rundschau, CH-8047 Zurich, Switzerland.

The beverage of the invention comprises preferably at least 25 µg/ml Cereal-LTP, whereas the optional concentration of Cereal-LTP and in particular cereal-seed-LTP is 100 µg/ml or more.

The Cereal-LTP can be recognized by its sequential structure.

The concentration of Cereal-LTP may be measured by use of an Enzyme-Linked Immunosorbent Assay (ELISA) for Cereal-LTP. Such Cereal-LTP ELISA is not available on the market, but can be produced following standard techniques comprising the steps of a) producing an antibody to Cereal-LTP by immunizing an animal, obtaining serum and purifying the antibody, b) biotinylating the antibody, and c) making an LTP standard curve by means of a competitive ELISA procedure involving a component which can be measured by e.g. a spectrophotometer.

ELISA methods as such are generally known to persons skilled in the art and constitute one of the most common methods used today to measure bioactive components.

General information about ELISA assays can be found in Ref. 23.

Preferably, the beverage of the invention also contains hordein, glutelin, other albumins such as protein Z obtainable from beer and/or hop components such as hop iso-α acids and other bitter resins of hop. These components have a foam stabilizing effect and a synergistic foam forming effect with the Cereal-LTP.

The beverage may also contain carbohydrate, lipids and/or fatty acids. These components improve the taste and the body of the beverage.

Some of the above-mentioned components, e.g. hordein, hop and lipids, may combine with the LTP, if they are boiled together. The foaming properties of Cereal-LTP modified by boiling with hop components and/or triglyceride are improved.

The beverage may also contain other components in small amounts, such as stabilizers (alginacids, alginate, carrageenan, glycerides, gum arabic, pectin), artificial sweetening agents, flavouring agents, colouring agents, vitamins, minerals, preservatives, effervescence generating agents, antioxidants and enzymes, particularly protein degrading enzymes and carbohydrate degrading enzymes.

When the beverage of the present invention is beer, the content of Cereal-LTP is preferably more than 5% by weight, particularly more than 10% by weight, and preferably more than 15% by weight of the total protein content. The weight of modified Cereal-LTP is calculated as the weight of the corresponding amount unmodified Cereal- LTP, i.e. the weight of other components bound to the Cereal-LTP is not included.

The present invention also comprises a method of making a beverage containing protein and/or peptide. This method is characterized by the feature of claim 11.

The Cereal-LTP may be added in any form provided that it is at least partially soluble.

In practice it can be added in the form of ground or crushed cereal material or in the form of an extract of cereal materials.

Such an extract may be obtained in any way, e.g. by boiling and/or mashing the cereals or cereal material in liquid and, if desired, purifying by filtration and optionally fractionating the filtrate. The liquid may preferably also contain hop and/or lipids, particularly triglycerides. The extract may also be dried, e.g. by lyophilization or spray drying.

The Cereal-LTP may e.g. be obtained in modified form from beer as described in the examples later on.

The Cereal-LTP may also be obtained from a microorganism, e.g. a yeast, a fungus or a bacteria comprising the DNA sequence encoding for Cereal-LTP in the genome. As a number of Cereal-LTP's encoding DNA sequences are known, a person skilled in the art will be able to incorporate such DNA sequence into the genome of bacteria, yeasts or fungi by use of known techniques. The yeast could e.g. be *Saccharomyces carlsbergensis* or cerevisiae.

The Cereal-LTP could be produced e.g. by the Cereal-LTP producing microorganism in the beverage in a step of fermentation.

If the beverage is not fermented, the Cereal-LTP is preferably added in form of a purified soluble extract.

The Cereal-LTP may naturally also be added to the fermented beverage in form of a purified soluble extract, but as the production of fermented beverages normally comprises a filtration step, there may be no need to purify the Cereal-LTP extract.

The Cereal-LTP may be added in any production step, all at the same time or little by little, continuously or discontinuously.

When the beverage is beer, the Cereal-LTP could be added e.g. in the step of preparing malt or malt extract by making the malt from cereal-seeds which are refined to have a high content of LTP, e.g. by use of genetic transmission.

The Cereal-LTP may also be added during preparation of wort, e.g. in the form of ground or crushed cereal material, in particular ground seeds which are added before the mashing step.

The present invention also includes the use of Cereal-LTP as a foam forming additive to beverage. This use is V claimed in claims 21–23.

When the Cereal-LTP is used according to the invention it may preferably be in combination with other components including proteins, but preferably the Cereal-LTP constitutes at least 15%, most preferably 25% by weight f the total protein content. The weight of modified Cereal-LTP is calculated as the weight of the corresponding amount unmodified Cereal-LTP, i.e. the weight of other components bound to the Cereal-LTP is not included.

The invention will be further described in the following examples.

FIG. 2 shows gel filtration of collapsed foam from the third flotation of lager beer on Sephadex G-75 (5 cm×87 cm, 1700 ml) equilibrated with 50 mM ammonium acetate, pH 4.5.

FIG. 4 shows the dependence of the foam half-life on the concentration of HMW in water containing 0.3 mg/ml LMW.

Figure 5A:
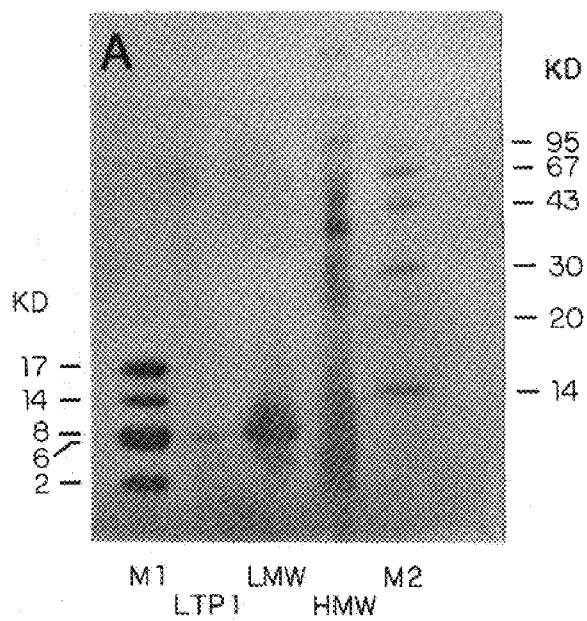
Figure 5B:
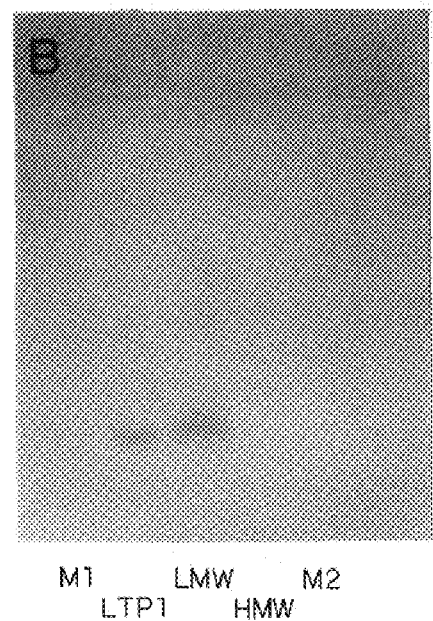

FIG. 5 shows A) SDS-polyacrylamide gel electrophoresis of HMW, LMW and barley-LTP1. (20% homogeneous gel. Phast-system. Coomassie Blue R 350 staining). M1 and M2 are molecular weight markers. B) Western-blotting of HMW, LMW and barley-LTP1 using specific antibodies against barley-LTP1.

Figure 6:
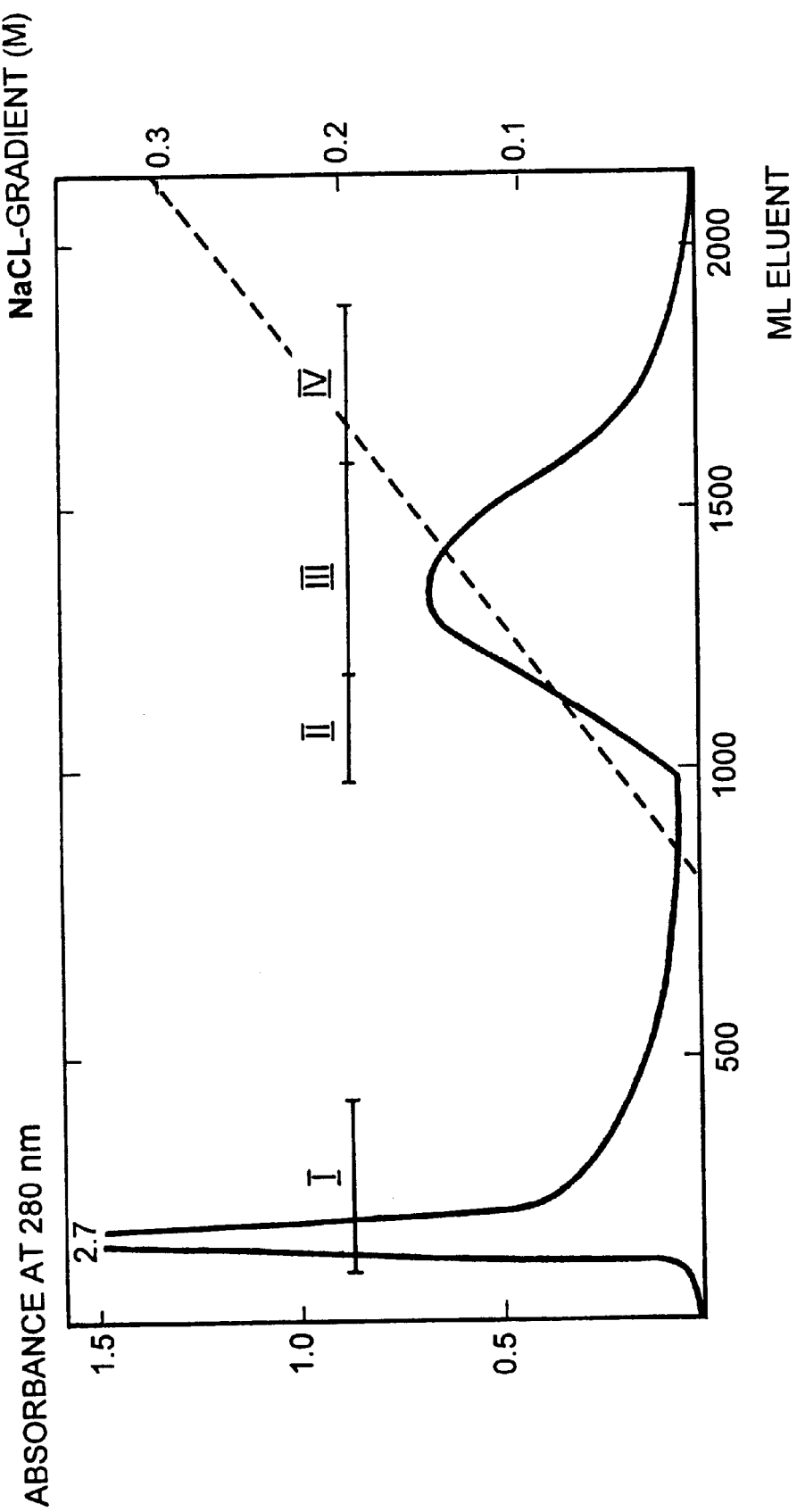

FIG. 6 shows ion exchange chromatography of LMW on S-Sepharose Fast Flow (5×7 cm, 135 ml) equilibrated with 20 mM Na acetate, pH 4.9 - - - NaCl gradient; __ absorbance at 280 nm.

Figure 7:
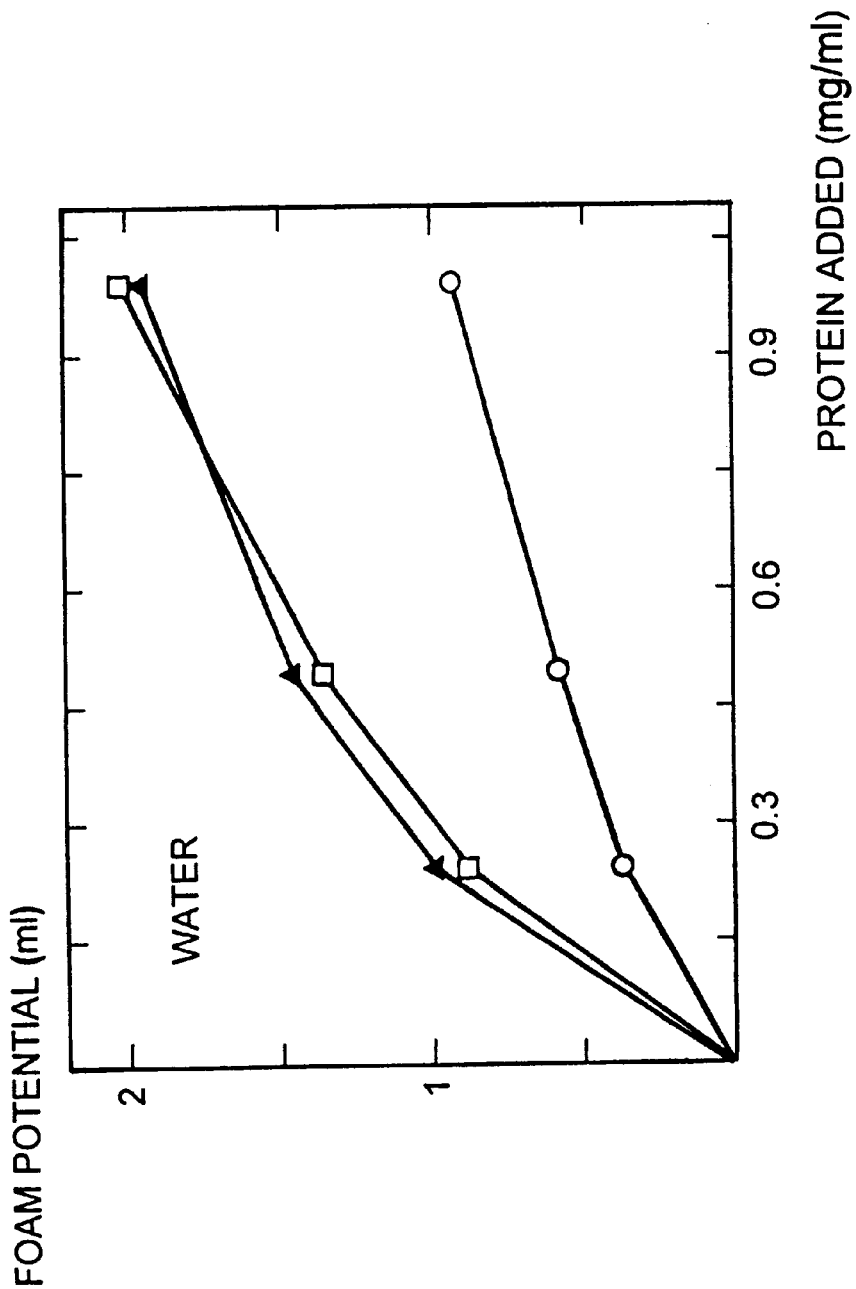

FIG. 7 shows foam potentials obtained by foam assays performed on distilled water containing increasing concentrations of Pool I, Pool III or LTP1. The concentration of dissolved protein was calculated from amino acid analyses.

Figure 8:
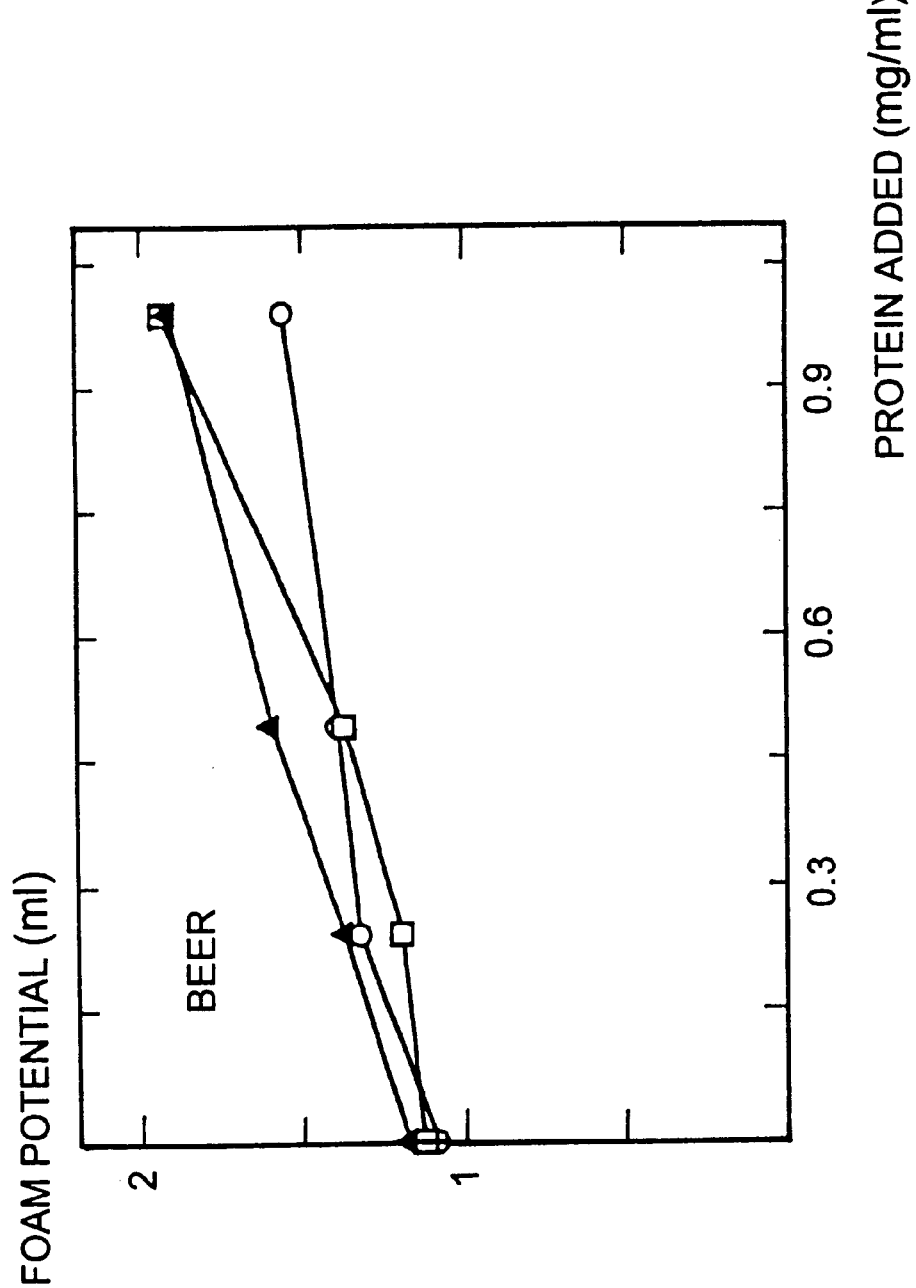

FIG. 8 shows foam potentials obtained by foam assays performed on beer containing increasing concentrations of Pool I, Pool III or LTP1. The concentration of dissolved protein was calculated from amino acid analyses.

Figure 9:
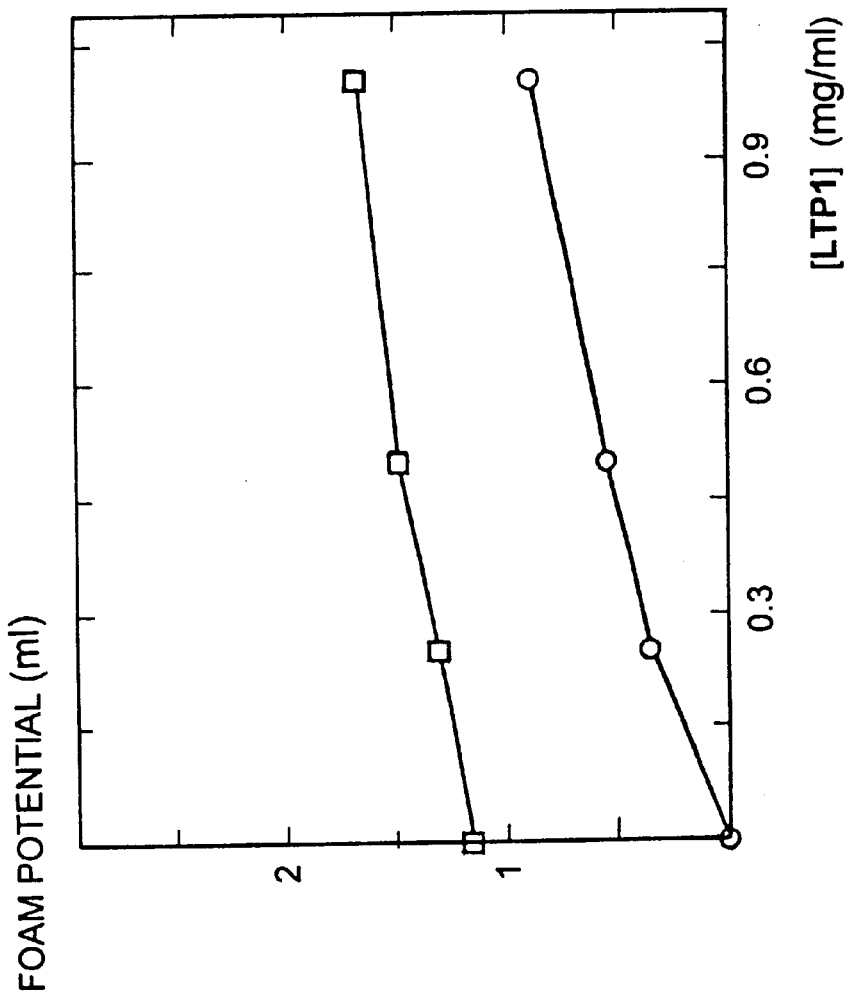

FIG. 9 shows foam potentials obtained by foam assays performed on water solutions containing increasing concentrations of barley-LTP1 alone or in the presence of 0.4 mg/ml Pool I. The concentration of dissolved protein was calculated from amino acid analyses.

Figure 10:
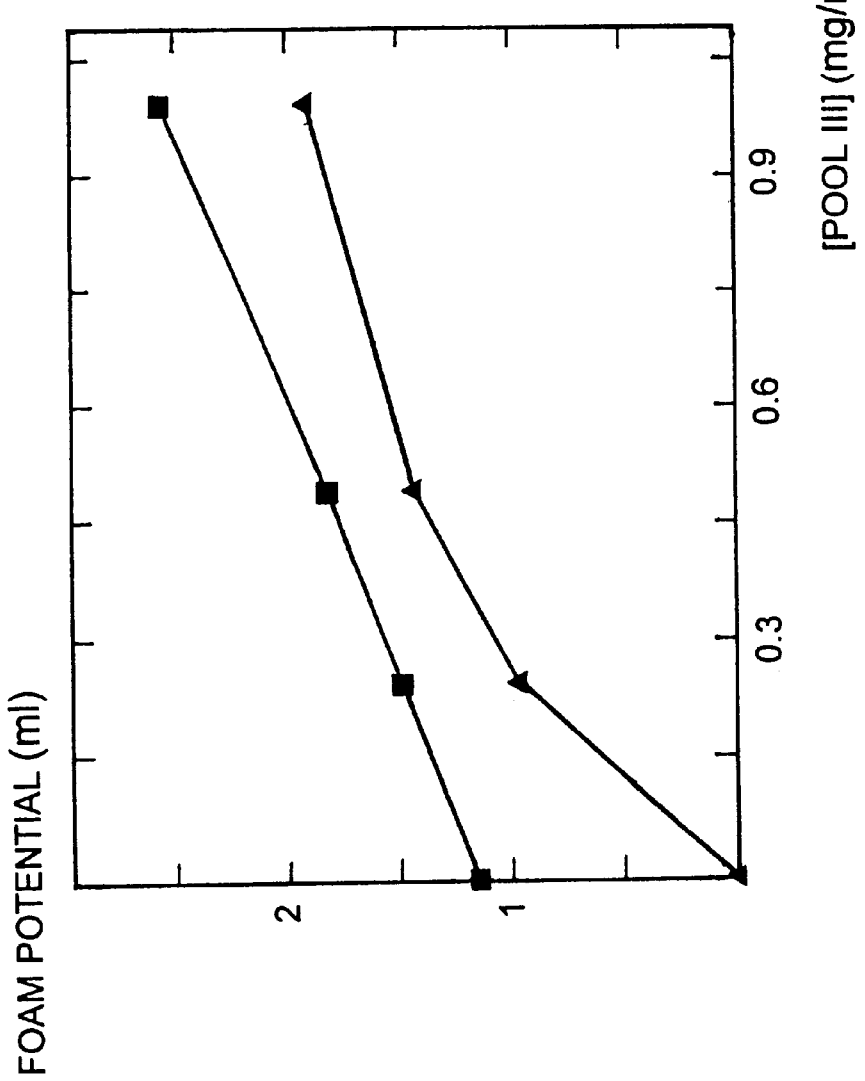

FIG. 10 shows foam potentials obtained by foam assays performed on water solutions containing increasing concentrations of Pool III alone or in the presence of 0.4 mg/ml Pool I. The concentration of dissolved protein was calculated from amino acid analyses.

Figure 11:
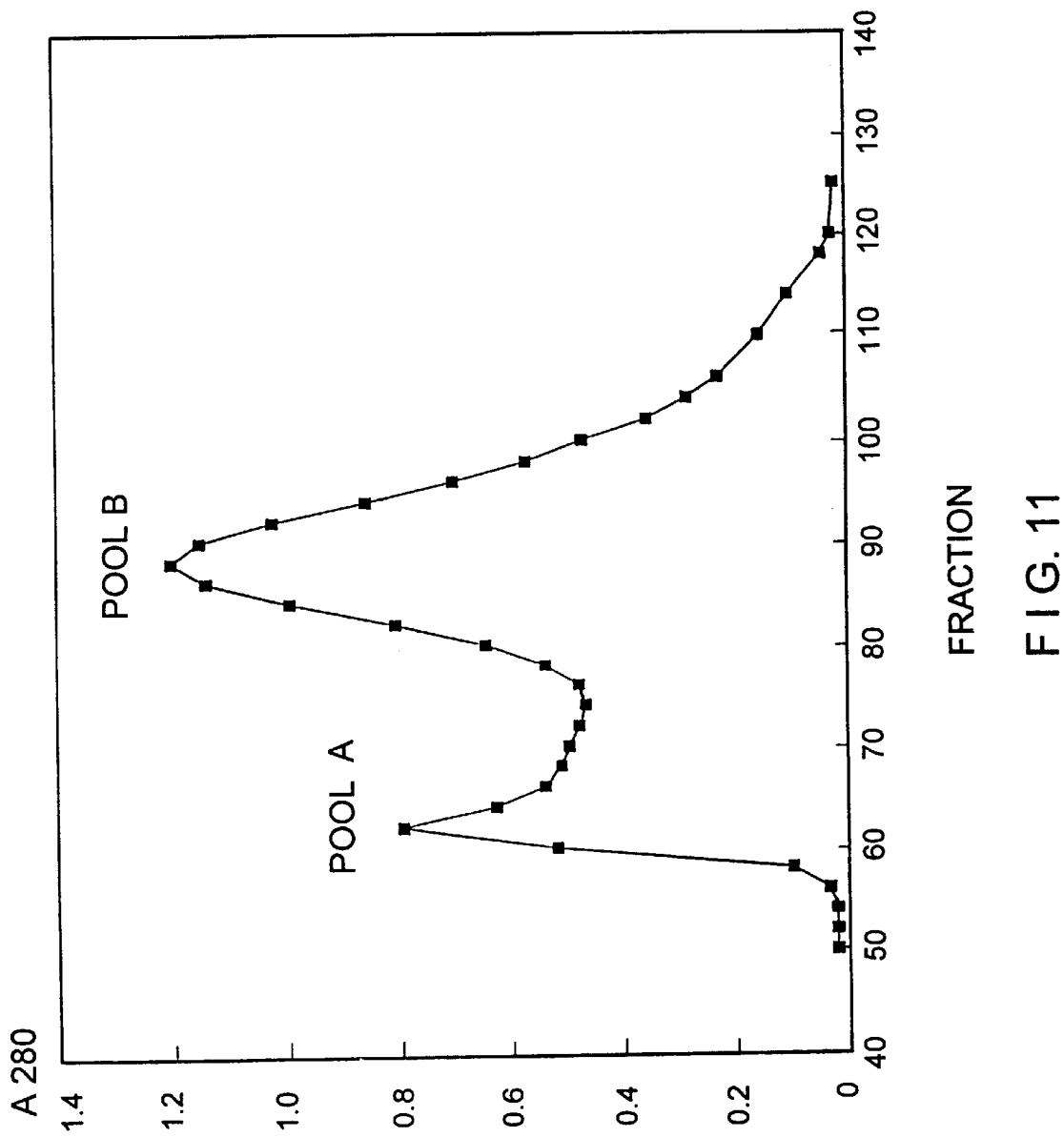

FIG. 11 shows gelfiltration of pool III isolated from the third flotation of lager beer on Sephadex G-50 equilibrated with 20 mM NaAc, 0.1M NaCl, pH 4.9.

Figure 12A:
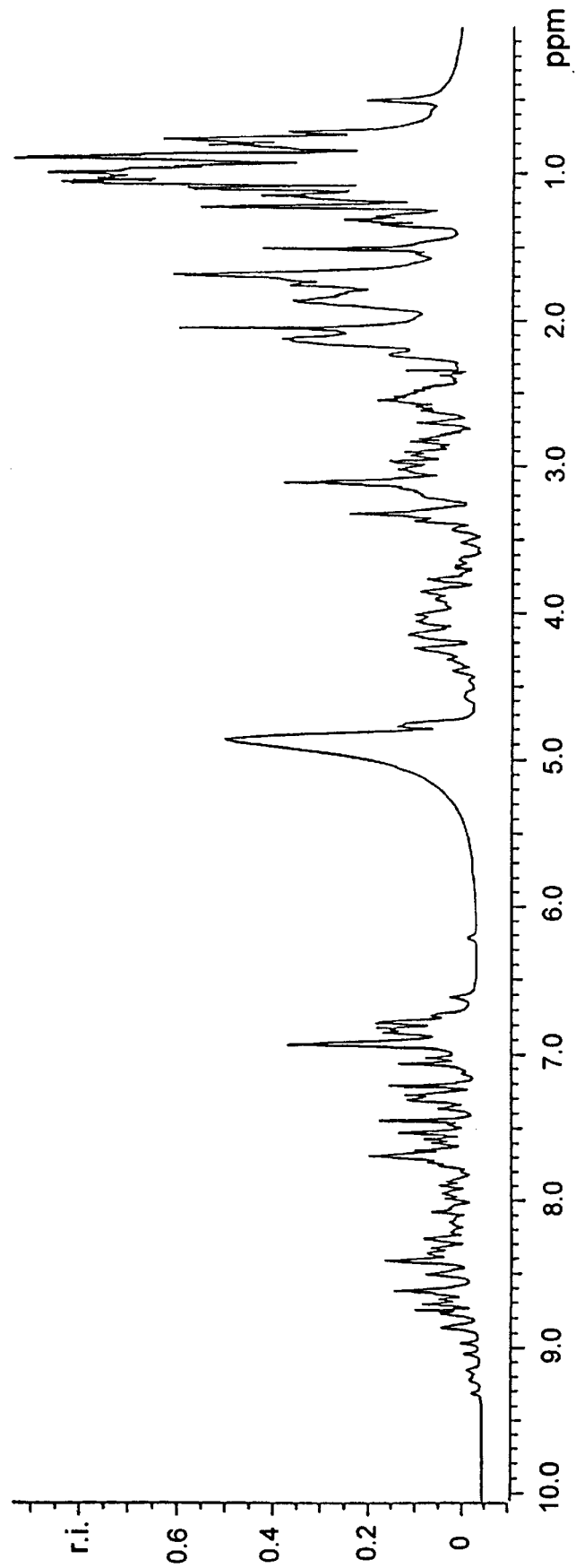
Figure 12B:
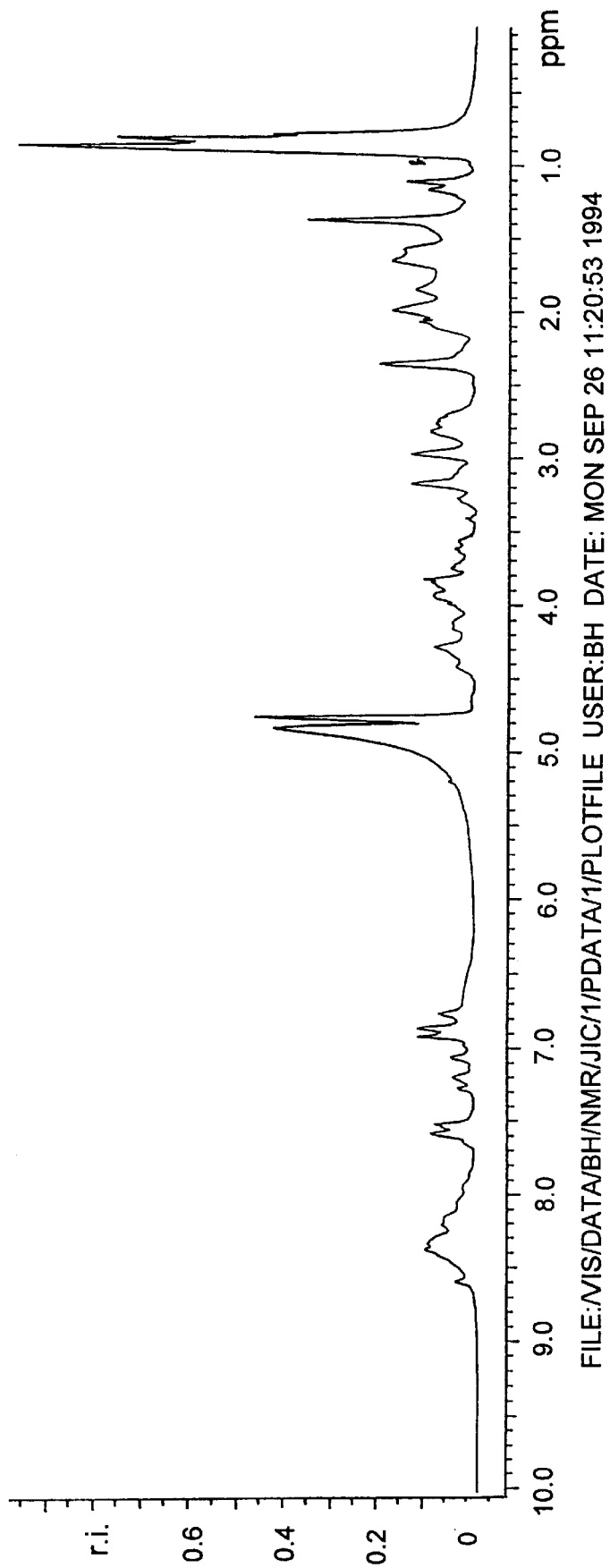

FIGS. 12A and 12B show 'H NMR spectra of barley seed LTP1 and beer foam LTP1, respectively.

PRODUCTION OF MALT

The malt used in the following examples was produced as lager malt (light malt).

PRODUCTION OF CONGRESS WORT USING EBC STANDARD MASHING METHOD

Milling 55 g of malt was ground by milling and 50 g of flour was transferred to a mash beaker.

The milling process was performed in a Bühler-Miag disc mill with a distance of 0.2 mm between the discs.

Mashing

The mashing bath was attemperated to about 45° C.

200 ml of distilled water at a temperature of about 46° C. was poured into the beaker while stirring with a glass rod and balling was avoided. It was ensured that the temperature in the mash was exactly 45° C.

The beaker was placed immediately in the mashing bath and the stirrer was set in motion. The temperature was maintained at 45° C. in the mash for exactly 30 min.

The temperature in the mash was then raised 1° C. per minute for 25 min.

When the temperature of 70° C. was reached, a further 100 ml of distilled water at 70° C. was added. The temperature was maintained at 70° C. for 1 h. The mash was cooled to room temperature in 10–15 min. The stirrer was washed with a small amount of distilled water, the outside of the beaker was dried and the contents of the beaker was adjusted to 450.0 g by addition of distilled water.

Filtration

The content of the beaker was thoroughly stirred with a glass rod and emptied immediately and completely onto a paper filter.

The first 100 ml of the filtrate was returned to the funnel.

The filtration was stopped when the cake appeared dry or in case of slow filtration after 2 h.

ANALYTICAL PROCEDURES

Identification of Barley-LTP1

Western-blotting

SDS polyacrylamide gel electrophoresis was performed after boiling for 15 min with 10 mM dithiothreitol using a Pharmacia Phast-System and 20% homogenous gels. Blotting onto nitrocellulose was then performed in the Phast-System apparatus at 70° C. for 30 min. After washing with water, the nitrocellulose was incubated 30 min with calf serum to block unspecific binding and then incubated overnight with specific LTP1 antibodies (prepared as described in Example 8). The Promega Western blot AP system (Catalogue No. W3930) was then applied to detect specific antibody binding. A mixture of nitro blue tetrazolium and 5-bromo-4-chloro-3-indolyl phosphate was used as color development substrate for alkaline phosphatase.

N-terminal amino acid sequencing

N-terminal amino acid sequencing was performed on an Applied Biosystems model 470A gas-phase sequencer, using the programme provided by the company. The phenylthiohydantoin-labelled amino acids from the sequencer were identified on-line by reversed-phase HPLC using an Applied Biosystems model 120A phenylthiohydantoin analyzer.

Amino acid compositions were determined on a LKB, model Alpha Plus, amino acid analyzer after hydrolysis in 6M HCl at 110° C. for 24 h in evacuated tubes.

Determination of carbohydrate content

The carbohydrate content was determined by the phenol/sulfuric-acid method (Ref. 7).

Determination of protein content

The protein content was determined from amino acid analyses or by the dye-binding method of Bradford (Ref. 5).

Foam assays

An opto-electrical foam assay system (Refs. 8,9) using digital video image analysis was used to measure foam potential and foam half-life with a 10 ml sample. The foam potential (P) is the amount of foam in ml formed initially per ml sample. The foam half-life (F) is the time in seconds for the foam column to reach half the initial volume. The foam content is the foam potential multiplied by the volume in ml. Fractions or pools of fractions obtained after chromatography were dialyzed against distilled water in Spectra/pore dialysis membranes (cutoff 3,500 Dalton) before foam assays were performed or lyophilized to remove ammonium acetate. Foam assays were conducted in quadruplicates.

The Foam Stability Analyzer, System Carlsberg, (Ref. 21) was used for foam assay of bottled beer containing $CO_2$. The foam drainage half-life determined by this method is the half-life (in seconds) for the decay of foam into beer after a fully conversion of 150 g beer into foam. This decay is, after an inital lag of about 30 seconds, a first order process (Ref. 22).

EXAMPLE 1

Isolation and purification of Cereal-LTP from barley seeds

LTP1

Procedure a)

Pure barley-LTP1 was isolated from 25 kg barley flour (variety Alexis harvested in Denmark in 1992) by extraction with 250 l water at pH 6.5 for 2 h. The mixture was left overnight at 2° C. to permit insoluble material to precipitate. The supernatant was concentrated by ultra-filtration to 7 l and ammonium sulfate added to 40% saturation. After 2–3 h at 2° C. the precipitate was removed by centrifugation and to the supernatant was added ammonium sulfate at 75% saturation. After 16 h at 2° C. the resultant suspension was centrifuged yielding a precipitate which could be stored at 2° C. for several weeks. A quater of the precipitate was dissolved in 500 ml water, heated to 100° C. and immediately cooled on ice. The solution was centrifuged to remove any precipitated matter and dialyzed in a Spectra/por® dialysis membrane (cutoff 3,500 Dalton) against water. After centrifugation, the dialysate adjusted to pH=7.0 by addition of NaOH was subjected to ion exchange chromatography on a column of CM cellulose (5 cm×25 cm, 500 ml) equilibrated with 20 mM Na-phosphate, pH 7.0. Western-blotting revealed barley-LTP1 to be eluted by a NaCl gradient from 0 to 0.1M. Fractions containing LTP1 were combined, dialyzed in a Spectra/por® membrane against water and applied to a column of S-Sepharose Fast Flow (5 cm×15 cm, 300 ml) equilibrated in 20 mM Hepes, pH 7.0. Barley-LTP1 was eluted by applying a NaCl gradient from 0 to 0.3M NaCl in the same buffer. Fractions containing barley-LTP1 as found by Western-blotting were pooled, dialyzed against distilled water in a Spectra/por® dialysis membrane and lyophilized. N-terminal amino acid sequencing revealing the sequence Leu-Asn-*-Gly-Gln-Val-Asp-Ser- where the star denotes a blank position corresponding to the cysteine found at this position in LTP1 showed that the isolated LTP1 was pure.

Procedure b)

Similar to procedure a) except that the heating step was omitted.

No difference in foaming properties or immunoreactivity was observed for LTP prepared according to procedures a) or b).

EXAMPLE 2

Purification of LTP1 from beer foam

Figure 1:
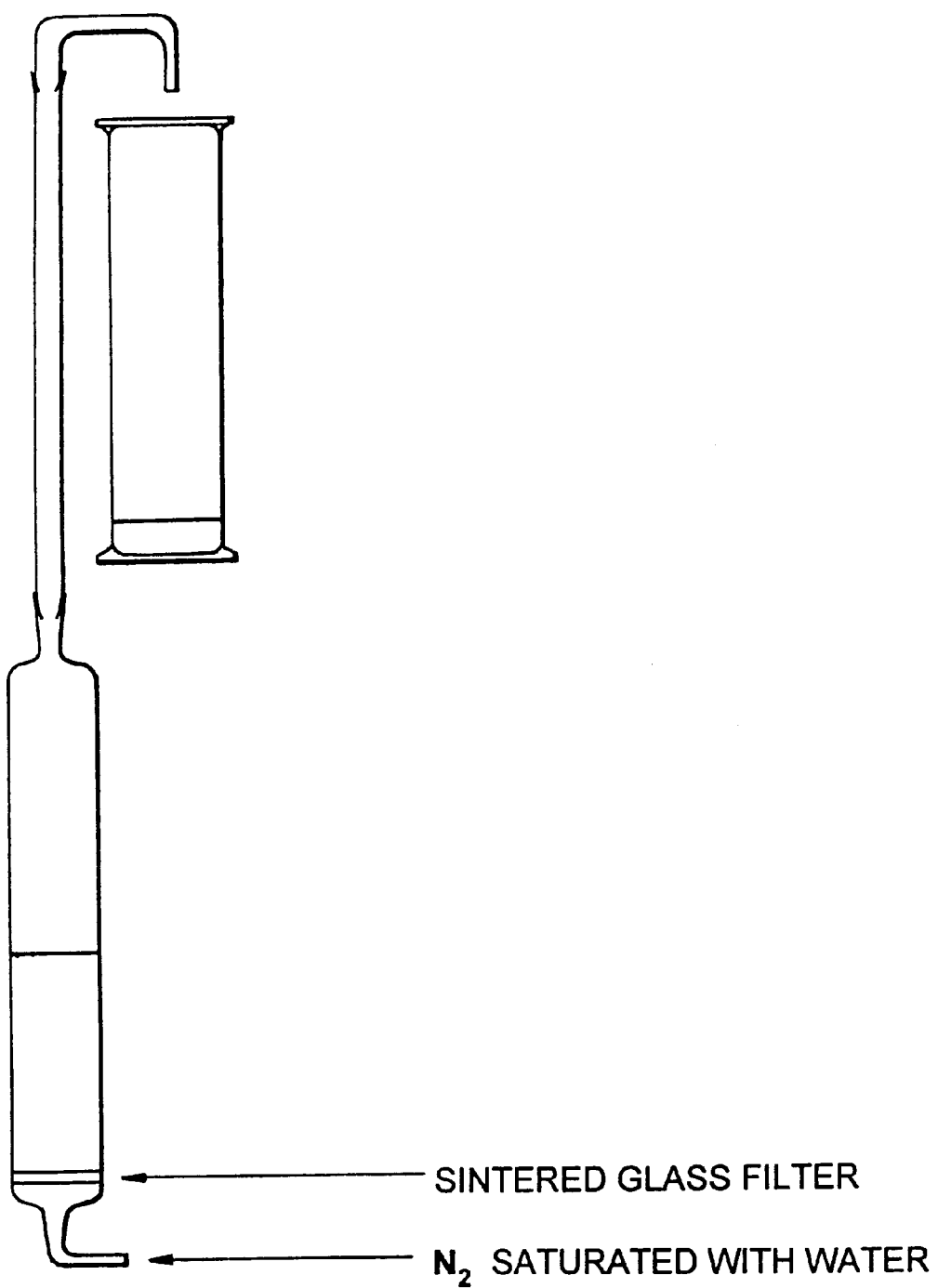
FIG. 1 shows a foam tower for 1,65 l of beer constructed in borosilicate glass.

A continuous foam tower was constructed in borosilicate glassware as shown in FIG. 1. Foam was produced from 15 l (or from 1.65 l in which case all amounts of chemicals mentioned in the following were reduced by factor 9) of lager beer by sparging with 450 ml/min nitrogen gas overnight. The nitrogen gas was saturated with water vapor before introduction into the foam tower. The foam collected at the outlet was collapsed and diluted to the original beer volume with distilled water and reintroduced into the foam tower. A second and a third flotation was performed as described above, and the foam collected from the third flotation of lager beer was found to contain 35% of the total foam content in the original beer.

The components contained in the collapsed foam from the last flotation were separated according to molecular weight by gel filtration on Sephadex G-75 in a column (5 cm×87 cm, 1700 ml) equilibrated with 50 mM ammonium acetate, pH 4.5. Gel filtration of the collapsed foam from the third flotation on Sephadex G-75 resulted in three peaks absorbing at 280 nm (FIG. 2). Two of the peaks were named HMW and LMW, respectively, as indicated in FIG. 2. The HMW-fraction was composed of about 90% carbohydrate and 10% protein while the LMW-fraction was composed of 90% protein and 10% carbohydrate. The third peak was found to contain low molecular weight compounds such as amino acids, isohumulones and carbohydrates.

The amino acid composition of the LMW fraction and the pooled fractions resembled the amino acid composition of a well-known barley lipid transfer protein (LTP1) (Ref. 18) (Table II). SDS polyacrylamide gel electrophoresis of LMW revealed a smear by staining with Coomassie Blue R 350 covering molecular weights in the range 6,000–18,000 Dalton (FIG. 5). However, Western-blotting using specific antibodies against barley-LTP1 revealed barley-LTP1 (molecular weight 9,700 Dalton) to be a major component of LMW (FIG. 5). This was confirmed by N-terminal amino acid sequencing.

The amino acid composition of LMW showed too high values of Pro and Glx when compared to that of barley-LTP1 (Ref. 18) (Table II), presumably due to the presence of hordein and glutelin fragments; the smear found by silver-staining after SDS polyacrylamide gel electrophoresis could be such fragments.

The LMW-foam fraction was lyophilized to remove ammonium acetate. LTP1 was purified from the LMW-foam fraction obtained from 15 l lager beer by ion exchange chromatography on S-Sepharose Fast Flow (FIG. 6). The LMW fraction was applied to a column (5×7 cm, 135 ml), equilibrated with 20 mM Na acetate, pH 4.9, and after washing LTP1 was eluted in a broad peak (Pool II–IV, FIG. 6) by applying a linear NaCl gradient (0–0.3M) in the same buffer. The run-through fraction and the three pools of fractions containing LTP1 as determined by Western-blotting were dialyzed against distilled water in Spectra/por® dialysis membrane (cutoff 3,500 Dalton) and lyophilized.

Ultrafilter: DDS-GR81PP, Dow Filtrations, Denmark
Spectra/por®: Spectrum Medical Industries, Inc., USA
CM-cellulose: Whatman Biosystems Ltd., England
S-Sepharose Fast Flow: Pharmacia, Sweden Sephadex G-75: Pharmacia, Sweden

TABLE II

Pools from S-Sepharose Fast Flow Chromatography of LMW

|   |   | Pool I | Pool II | Pool III | Pool IV | LMW | LTP1[a] |
|---|---|---|---|---|---|---|---|
| Asx | (mol %) | 7.8 | 11.5 | 14.3 | 14.5 | 12.6 | 16.5 |
| Thr | (mol %) | 6.1 | 4.3 | 3.8 | 3.7 | 4.5 | 3.3 |
| Ser | (mol %) | 6.7 | 7.3 | 7.8 | 7.8 | 7.4 | 8.8 |
| Glx | (mol %) | 20.7 | 13.7 | 10.2 | 9.6 | 13.3 | 6.6 |
| Pro | (mol %) | 9.6 | 8.5 | 7.8 | 7.9 | 8.1 | 6.6 |
| Gly | (mol %) | 7.1 | 8.5 | 9.6 | 9.6 | 8.9 | 9.9 |
| Ala | (mol %) | 7.3 | 6.3 | 5.5 | 5.8 | 6.1 | 4.4 |
| ½ Cys | (mol %) | 4.3 | 6.5 | 7.6 | 7.5 | 6.4 | 8.8 |
| Val | (mol %) | 6.8 | 6.9 | 6.4 | 6.1 | 6.6 | 6.6 |
| Met | (mol %) | 2.2 | 1.6 | 1.3 | 1.2 | 1.6 | 1.1 |
| Ile | (mol %) | 3.7 | 4.6 | 5.1 | 5.0 | 4.7 | 6.6 |
| Leu | (mol %) | 7.8 | 7.8 | 7.4 | 7.2 | 7.5 | 6.6 |
| Tyr | (mol %) | 1.7 | 2.1 | 2.5 | 2.5 | 2.3 | 3.3 |
| Phe | (mol %) | 2.5 | 1.5 | 0.6 | 0.6 | 1.2 | 0 |
| His | (mol %) | 1.2 | 1.7 | 1.8 | 2.0 | 1.7 | 2.2 |
| Lys | (mol %) | 2.0 | 3.3 | 3.6 | 4.1 | 3.3 | 4.4 |
| Arg | (mol %) | 2.5 | 4.1 | 4.6 | 5.0 | 4.1 | 4.4 |
| Protein (mg) |  | 87 | 33 | 190 | 38 | 392 |  |
| Carbohydrate (mg) |  | 24.0 | 1.3 | 0 | 0 | 25.6 |  |
| Foam half-life[b] (sec.) |  | 356 | 44 | 68 | 54 | 172 |  |
| Foam potential[b] ml foam/ml sample |  | 1.3 | 1.1 | 1.5 | 0.8 | 1.3 |  |
| Foam content |  | 378 | 73 | 685 | 63 | 1260 |  |

[a])Values from Ref. 18
[b])Measured on water solutions having A (280 nm) = 0.5

Amino acid analyses after acid hydrolysis (Table II) performed on the break-through peak and the three pools comprising the broad peak revealed that the break-through fractions had amino acid compositions resembling hordeins and glutelins having a high Glx and Pro content, while the broad peak eluted during the NaCl gradient was estimated to be rather pure LTP1 from amino acid analyses (Table II) and N-terminal amino acid sequencing, although SDS polyacrylamide gel electrophoresis still revealed traces of Coomassie staining compounds having molecular weights in the range 6,000–18,000 Dalton in the three pools comprising the broad eluate peak. Both the hordein/glutelin containing break-through fraction (Pool I) and the LTP1 fractions (Pools II–IV) produced foam of good potential in water (Table II), but the foam half-life for the LTP1 fractions was very low, contrary to the hordein/glutelin fraction producing foam with a high foam half-life (Table II). Calculation of the foam content in the four pools revealed that 95% of the foam content found in LMW was present in the four pools (Table II).

EXAMPLE 2A

Frationation of Pool III

Pool III, obtained from lager beer as described in Example 2, was fractionated according to molecular weight by gel-filtration on Sephadex G-50 in a column (2.6 cm×67 cm, 330 ml) equilibrated with 20 mM NaAc, 0.1M NaCl, pH 4.9. This separation resulted in two peaks absorbing at 280 nm, pool A and pool B (FIG. 11). SDS-PAGE under non-reducing conditions and Western-blotting using specific antibodies against barley-LTP1 revealed that pool A was composed mainly of dimeric forms of LTP, but also larger multimeric forms were observed. In contrast, only monomeric LTP1 was found in pool B.

EXAMPLE 2B

A ¹H NMR spectra was recorded for the LTP1 obtained from barley (Example 1b) and the LTP1 obtained from the beer foam, respectively. The spectra have been recorded at 310 K (37° C.) and pH 4.0.

The resulting spectra are shown in FIGS. 12A and 12B. The spectrum (FIG. 12A) of barley seed LTP1 shows a ¹H NMR spectrum which is typical for a globular protein where a majority of the secondary structure is α-helix.

This is seen by the majority of the $H^\alpha$ nuclei having chemical shifts below 4.8 ppm. Furthermore, the dispersion of the NMR signals is a clear indication that a substantial part of the protein is folded and that it has a well-defined secondary structure.

A detailed analysis of COSY (correlation spectroscopy), TOCSY (total correlation spectroscopy), and NOESY (nuclear Overhauser spectroscopy) spectra has confirmed that the barley seed LTP1 is globular protein with a well-defined structure.

The spectrum (FIG. 12B) of beer foam LTP is typical for proteins that are substantially or partly unfolded with substantially no secondary and tertiary structure. We may conclude that LTP1 isolated from beer is more or less denatured.

EXAMPLE 3

Purification of LTP1 from first wort

First wort was obtained from a production of lager beer from the Carlsberg Brewery. The wort was centrifuged in a Sorwall RC3 centrifuge for 30 min at 4,000 rpm to remove any insoluble material. Ammonium sulfate was added to a final concentration of 85% and after 16 h at 4° C. the resultant suspension was centrifuged for 30 min at 4,000 rpm. The precipitate was dissolved in 300 ml of water and 2×60 ml was subjected to gel filtration using Sephadex G-75 in a column (5 cm×87 cm, 1700 ml) equilibrated with 50 mM ammonium acetate, pH 4.5. The elution pattern was similar to that obtained upon gel filtration of collapsed foam (FIG. 2). The combined LMW fractions were lyophilized (to remove ammonium acetate), dissolved in water, dialyzed and subjected to ion exchange chromatography on S-Sepharose Fast Flow (5×7 cm) equilibrated with 20 mM Na acetate, pH 4.9. LTP1 was eluted by applying a linear NaCl gradient (0–0.3M) in the same buffer. The elution profile was similar to that shown in FIG. 6 for fractionation of the LMW fraction isolated from foam. Fractions constituting Pool III was pooled and dialyzed against distilled water in a Spectra/por® dialysis membrane (cutoff 3,500 Dalton) and lyophilized. The concentration of LTP1 (modified and unmodified) was determined by amino acid analysis.

EXAMPLE 4

The HMW and LMW fractions obtained from lager beer as described in Example 2 were tested for their ability to form foam in water. The results appear from Table III.

TABLE III

Foam potential (P) and foam half-life (F) for mixtures of HMW and LMW in water

| LMW | HMW (µg/ml) | | | | |
|---|---|---|---|---|---|
| (µg/ml) | 0 | 0.3 | 0.6 | 1.2 | 2.4 |
| 75 P (ml foam/ml sample) | 0.56 ± 0.04 | 0.63 ± 0.04 | 0.68 ± 0.03 | 0.69 ± 0.06 | 0.75 ± 0.05 |
| F (sec) | 199 ± 15 | 251 ± 67 | 236 ± 26 | 300 ± 3 | 313 ± 71 |
| 150 P (ml foam/ml sample) | 0.89 ± 0.05 | 0.95 ± 0.03 | 0.97 ± 0.03 | 1.04 ± 0.03 | 1.09 ± 0.05 |
| F (sec) | 177 ± 14 | 251 ± 27 | 309 ± 30 | 276 ± 8 | 293 ± 37 |
| 300 P (ml foam/ml sample) | 1.34 ± 0.02 | 1.34 ± 0.09 | 1.40 ± 0.01 | 1.41 ± 0.05 | 1.47 ± 0.06 |
| F (sec) | 185 ± 32 | 251 ± 18 | 251 ± 29 | 290 ± 39 | 290 ± 29 |
| 600 P (ml foam/ml sample) | 1.89 ± 0.08 | 1.99 ± 0.15 | 1.83 ± 0.05 | 2.01 ± 0.09 | 2.10 ± 0.07 |
| F (sec) | 208 ± 61 | 258 ± 65 | 239 ± 10 | 263 ± 102 | 277 ± 24 |

Figure 3:
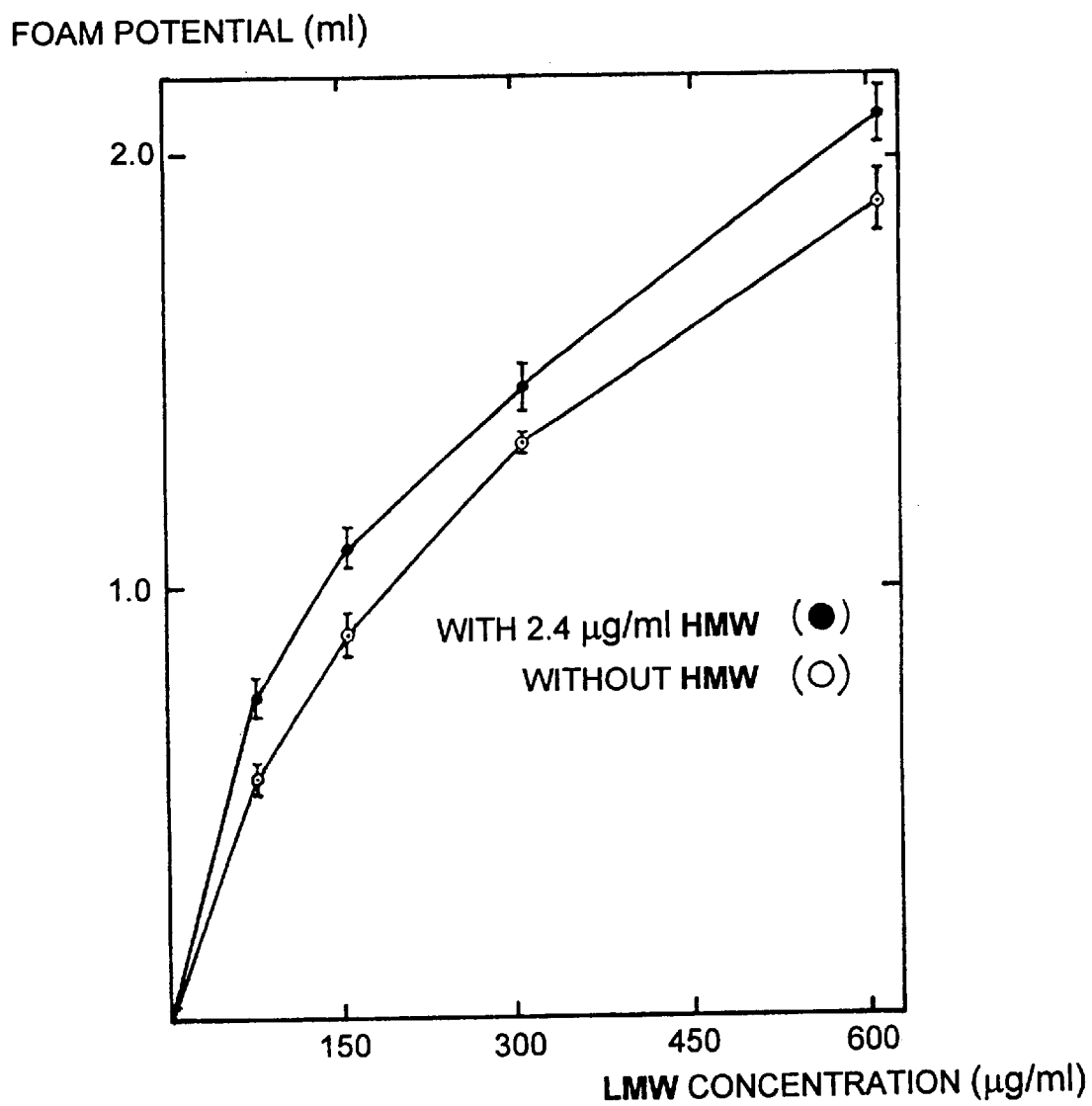
FIG. 3 shows the dependence of the foam potential on the concentration of LMW in foam assays.

This result shows that the concentration of the LMW fraction has great influence on the foam potential irrespective of the concentration of HMW. This is further illustrated in FIGS. 3 and 4 using values from Table III.

EXAMPLE 5

LTP1 was isolated from 5 different lager beers differing in their foam potential. LTP was obtained from 1.65 l beer essentially as described in Example 2, only using separation on Mono S instead of S-Sepharose Fast Flow.

The lager beers were brewed with different barley varieties according to the following:

A: Blenheim

B: Caruso

C: Grit

D: Eminant

Mixture: Mixture of unknown barley varieties

The results appear from Table IV.

TABLE IV

Investigations on foam stabilizing fractions from lager beers brewed with different barley varieties

| Malt | Mixture[a] | A | B | C | D |
|---|---|---|---|---|---|
| Beer | | | | | |
| Foam potential ml foam/ml sample | 0.72 | 1.13 | 1.13 | 1.44 | 1.20 |
| Foam Half-life (sec) | 181 | 200 | 189 | 258 | 179 |
| Foam content per 1 beer | 715 | 1130 | 1130 | 1440 | 1200 |
| 2nd flotation | | | | | |
| Protein recovery (%) | 32 | 21 | 32 | 30 | 31 |
| Foam content per 1 beer | 240 | 490 | 360 | 670 | 520 |
| HMW | | | | | |
| Protein (% (w/w)) | 16 | 12 | 8 | 15 | 14 |
| Carbohydrate (% (w/w)) | 84 | 88 | 92 | 85 | 86 |
| LMW | | | | | |
| Foam content per 1 beer | 210 | 160 | 190 | 270 | 210 |
| Protein (% w/w) | 86 | 76 | 71 | 76 | 85 |
| Carbohydrate (% (w/w)) | 14 | 24 | 29 | 24 | 15 |
| Mono S[b] | | | | | |
| Run through fraction (% of protein) | 25 | 10 | 40 | 8 | 8 |
| Eluate fraction (% of protein) | 75 | 90 | 60 | 92 | 92 |

[a]Hops were not used
[b]Ion exchange resin, Pharmacia, Sweden

EXAMPLE 6

Foam assays were performed on LTP1 isolated from barley flour as described in Example 1, procedure b) and on Pool I and Pool III obtained from lager beer as described in Example 2.

The water used was distilled water.

The beer used was Carlsberg lager beer.

In each test 10 ml of either water or beer was used and the pools or LTP were added immediately before the foam was generated as earlier described.

When increasing concentrations of isolated LTP1, Pool I or Pool III were dissolved in water or beer, respectively, the solutions showed increased foam potential in foam assays (FIGS. 7 and 8), although the enhancement in foam potential was less pronounced for the beer solutions (FIG. 8) than for the water solutions (FIG. 7), possibly due to the foam positive components already present in the beer. At low protein concentrations the effect of adding the beer LTP1 fraction (Pool III) was greater than for the fraction containing hordein/glutelin fragments (Pool I). Addition of LTP1 isolated from barley flour to beer increased both the foam potential (FIG. 8) and the foam half-life a little. Furthermore, the effect on the foam potential by increasing concentrations of LTP1 (Example 5) is more pronounced for LTP1 isolated from beer (Pool III) than for LTP1 isolated from barley (FIG. 8). Recombination experiments, i.e. foam assays performed on solutions of 0.4 mg/ml Pool I in distilled water with increasing concentrations of LTP1 isolated from either barley or beer (Pool III) supported this observation (FIGS. 9 and 10). The effect of barley-LTP1 on the foam potential in the presence of Pool I was less than the effect of a similar concentration of Pool III.

EXAMPLE 7

ELISA assay (for determination of LTP1 concentration)

Production of antibodies to barley-LTP1

Two rabbits were immunized with 100 $\mu$g barley-LTP1 (obtained from Alexis barley flour as described in Example 1, procedure a)) per immunization according to the standard immunization scheme used at Dako, Glostrup, Denmark.

20 ml serum was obtained from each animal 54 days after the first injection and then at monthly intervals.

Serum obtained from the first bleeding of one animal was used throughout the experiments described below.

Purification of antibodies

Antibodies of the immunoglobulin G class (IgG) were purified from other serum components by affinity chromatography on Protein A-Sepharose (Pharmacia, Uppsala, Sweden) according to the manufacturer's instructions.

Antibodies recognizing LTP1 were separated from antibodies with other specificities by affinity chromatography on a small column prepared by covalently attaching LTP1 from barley to Sepharose. 64 mg barley-LTP1 was dissolved in 10 ml 0.1M NaHCO$_3$. 0.5M NaCl at pH 8.3 and was coupled to 2 g CNBr activated Sepharose 4B (Pharmacia, Sweden) according to the instructions of the manufacturer. 1 ml of the immunoadsorbent was then packed in a small column and equilibrated with 10 mM sodium phosphate, 150 mM NaCl, pH 7.3 (PBS$_{10}$). The IgG fraction purified by chromatography on protein A-Sepharose was applied on the column, which was washed with equilibration buffer until A$_{280}$ was 0.002. The bound IgG was eluted with 0.5M formic acid, pH 2.0, diluted with 4 vol 10×PBS$_{10}$ and pH was adjusted to 4.0 with NaOH. Finally, the sample was dialyzed against PBS$_{10}$ in a Spectra/por® membrane (cutoff 3,500 Dalton) and biotinylated as described below.

Biotinylation of antibodies 10 mg antibodies in 1 ml PBS were mixed with 0.1 ml 1M sodium carbonate buffer pH 9.5. The antibodies were then biotinylated by addition of 57 $\mu$l 0.1M BXNHS (biotinamidocaproate N-hydroxysuccinimide ester from Sigma, USA, Cat. No. B 2643) in DMSO (dimethylsulphoxide). The mixture was left 1 h at room temperature. After this, unreacted BXNHS was removed and the buffer was changed to PBS$_{10}$ by gel filtration performed according to the manufacturer's instructions on a small disposable Sephadex G-25 column (PD-10 from Pharmacia, Uppsala, Sweden) equilibrated with PBS 10 The antibody concentration in the reagent was adjusted to 1 mg/ml by addition of PBS$_{10}$ to a total volume of 10 ml. After addition of 100 mg BSA (bovine serum albumin), the reagent was stored in aliquots at −20° C.

Enzyme Linked Immunosorbent Assay (ELISA) for LTP

LTP was determined by means of a competitive ELISA procedure.

Initially, purified barley-LTP was adsorbed to the inner surface of polystyrene wells. The wells were arranged in strips of 12, and the strips were placed in frames each containing 8 strips (Nunc Immuno Module C12 Maxisorb from Nunc, Denmark). 200 $\mu$l of a dilute LTP1 solution obtained as described in Example 1, procedure a) (100 ng/ml PBS$_{10}$) was added to each well and incubated at 4° C., 16–20 h. After this incubation, residual binding sites on the polystyrene surface were blocked by incubating 225 $\mu$l BSA/PBST (1 mg BSA/ml PBST, where PBST is PBS with the addition of 0.05% Tween 20) in each well at 37° C., 1 h. The wells were then emptied and washed six times with PBST by means of a manual washing device matching the polystyrene strips (Nunc Immuno Wash 12 from Nunc, Denmark) and stored at −20° C. until use.

Prior to analysis, samples containing LTP1 were diluted appropriately in BSA/PBST, and standard solutions of LTP1 obtained as described in Example 1, procedure a) were prepared in the same buffer. Biotinylated antibodies recognizing barley-LTP1 were added to a final concentration of 100 ng/ml. 200 $\mu$l aliquots of the mixtures were then incubated in the wells 1 h at 37° C. Each sample or standard was analyzed in triplicate. After incubation, the wells were emptied and washed as described previously. In the next step, 200 $\mu$l aliquots of a streptavidin horseradish peroxidase conjugate (Sigma, USA, Cat. No. S 5512) diluted to 250 ng/ml in BSA/PBST were incubated in the wells 10 min at 20–22° C. After this, the wells were again emptied and washed.

Finally, 200 $\mu$l substrate solution containing 3,3',5,5'-tetramethylbenzidine (TMB, 100 $\mu$g/ml) and 0.015% H$_2$O$_2$ in phosphate citrate buffer, pH 5.0, was added to each well and incubated for 10 min at 20–22° C. The enzyme reaction was then stopped by adding 125 $\mu$l 4N HCl to each well, and the absorbance of the wells at 450 nm was measured in a spectrophotometer matching the 96-well frames (Perkin-Elmer Lambda Reader).

Each series of analyses included standards in the range 8000-62.5 ng barley-LTP1/ml. A standard curve was made by plotting the absorbance versus the log of the LTP1 concentration, and all concentrations of LTP1 in samples were calculated relative to this curve.

Specificity of the antibodies

The antibodies raised against barley-LTP1 and affinity-purified as described above were applied in Western blots against barley and malt extracts, wort, and beer. No reactions with other components than LTP1 or modified LTP1 were observed.

In ELISA assays, the antibodies recognized LTP1 or modified LTP1 from first wort and foam, but to a smaller extent than LTP1 from barley. The lower reactivity is due to modifications occuring during the mashing, wort boiling, fermentation and foaming processes. Compared to the concentrations determined by amino acid analysis (Example 3)

the reaction with LTP1 or modified LTP1 from first wort was about 65% of the reaction with LTP1 obtained from barley flour as described in Example 1, procedure a). The reaction with LTP1 or modified LTP1 from congress wort was determined to be about 90% of the reaction with LTP1 obtained from barley flour. As the standard curve was made on the basis of barley-LTP (obtained as described in Example 1, procedure a), the actual amount of LTP1 or modified LTP1 in congress wort could be determined by multiplying the estimate from the barley-LTP1 standard curve with 10/9.

EXAMPLE 8

Addition of LTP during the preparation of wort

To investigate the effect of addition of LTP during the wort boiling step a model system was established. Sweet wort was boiled in a round bottomed flask connected to a reflux cooler for 90 min, using a heating mantel. Two types of experiments were performed: a) pure barley-LTP1 Alexis (DK, 1992) obtained as described in Example 1, procedure a) (0.5 mg/ml) and/or hop extract (61 mg α-acid/l) was added when boiling was initiated and b) pure barley-LTP1 was added to the wort (boiled or unboiled, with or without hop extract (61 mg α-acid/l), but not subjected to boiling.

TABLE V

| Without added LTP | Foam potential | Addition of LTP (0.5 mg/ml) | Foam potential |
|---|---|---|---|
| Sweet wort | 0.37 ± 0.01 | Sweet wort | 0.75 ± 0.05 |
| Wort boiled without hops | 0.91 ± 0.06 | LTP added to wort before boiling without hops | 1.15 ± 0.02 |
| | | LTP dissolved in wort boiled without hops | 1.24 ± 0.09 |
| Wort boiled with hops | 1.68 ± 0.07 | LTP added to wort before boiling with hops | 2.15 ± 0.02 |
| | | LTP dissolved in wort boiled with hops | 1.93 ± 0.17 |

EXAMPLE 9

A beer with a high concentration of LTP1 was produced in the Carlsberg SOL Pilot Plant Brewery, using 60% lager malt and 40% adjuncts (maize grits). The maize grits were according to the specifications of the Carlsberg Breweries, i.e.

| water - % | <12.5, | |
|---|---|---|
| extract, dry weight, % P | >89% | |
| fat, dry weight, % | <1.0% | |
| sorting by | >2 mm | 0% |
| Pfungstadter bolter | >1.27 mm | <3.5% |
| | <0.25 mm | <5.0% |

The brewhouse process comprised a decoction mashing and wort boiling for 90 min with 10% evaportion. 15 min after initiation of wort boiling a crude preparation of LTP1 was added to the wort kettle. This preparation was extracted from 6×25 kg barley flour of Alexis harvested in Denmark, 1992, concentrated by ultrafiltration and precipitated with ammoniumsulfate as described above. The precipitate was dissolved in 5 l of $H_2O$, diafiltrated to 850 ml, heated to 100° C. and immediately cooled on ice. The solution was centrifuged in an Sorwall RC3 centrifuge for 30 min at 4000 rpm. The concentration of LTP1 in the supernant, as determined by the ELISA assay was 60 mg/ml, and 800 ml was added to the wort kettle. The final wort was 14.5% Plato. The brew was fermented with Carlsberg yeast (Saccharomyces carlsbergensis) in cylinder conical tanks. The primary fermentation was carried on for 9 days and maturation and stabilization lasted 10 days. Finally, the beer was filtered and debrewed to 10.6% Plato.

The foaming ability of this brew and a brew made from the same raw materials under identical conditions, but without addition of LTP1, was measured using the Foam Stability analyzer, System Carlsberg. The foam half-life of the high-LTP1 beer was increased to 113 sec compared to 93 sec for the beer without added LTP1.

EXAMPLE 10

Levels of LTP1 (the sum of modified and unmodified LTP1) in congress wort

Malt was made from a number of barley varieties normally used for beer brewing. The barley varieties were grown in different localities and were harvested in different years.

The malt was prepared as malt for lager beer.

Congress wort was produced from samples of the malt by use of the EBC standard mashing method as described above.

LTP1 (the sum of modified and unmodified LTP1) levels in the congress wort samples were determined by the ELISA procedure described above. A total of 82 wort samples were analyzed, corresponding to 41 malt samples.

The ELISA was made as described in Example 7 and the concentration of LTP1 was determined by use of the standard curve as equivalents of barley-LTP1, i.e. without multiplication with the correction factor.

The results are listed in Table V. Each value represents the average of two separate congress worts.

TABLE V

| Barley variety | Country of origin | Harvest year | LTP in congress wort mg/l |
|---|---|---|---|
| Triumph | France | | 65 |
| Ariel | | | 70 |
| unknown | Australia | | 85 |
| unknown | Germany | ? | 108 |
| Alexis | United Kingdom | 1992 | 66 |
| Triumph | France | 1992 | 76 |
| Ariel | Denmark | 1992 | 82 |
| unknown | Australia | ? | 99 |
| unknown | Australia | ? | 96 |
| unknown | Australia | ? | 78 |
| unknown | England | ? | 118 |
| Natasha | France | 1992 | 118 |
| Halcyon | France | 1992 | 78 |
| BL.IIIs | ? | 1991 | 92 |
| Natasha | France | 1992 | 104 |
| Natasha | France | 1992 | 102 |
| Halcyon | Denmark | 1992 | 109 |
| Caruso | France | 1993 | 120 |
| Senor | Denmark | 1993 | 70 |
| Alexis-81 | Denmark | 1993 | 82 |
| Jessica | Denmark | 1993 | 93 |
| Chariot | Denmark | 1993 | 79 |
| Goldie | Denmark | 1993 | 84 |
| Loke | Denmark | 1993 | 81 |
| Maud | Denmark | 1993 | 110 |
| unknown | India | 1993 | 121 |
| unknown | India | 1993 | 103 |
| unknown | England | ? | 110 |
| unknown | Scotland | ? | 117 |

TABLE V-continued

| Barley variety | Country of origin | Harvest year | LTP in congress wort mg/l |
|---|---|---|---|
| unknown | ? | ? | 140 |
| Lenka | Denmark | 1992 | 87 |
| Lenka | Denmark | 1992 | 98 |
| unknown | ? | 1993 | 61 |
| Natasha | France | 1992 | 76 |
| Halcyon | Denmark | 1992 | 69 |
| Alexis | England | 1992 | 75 |
| unknown | Denmark | 1992 | 100 |
| unknown | England | 1992 | 99 |
| unknown | England | 1992 | 93 |
| Alexis | Denmark | 1992 | 92 |
| Alexis | Denmark | 1992 | 91 |
| unknown | England | 1992 | 102 |
| Alexis | Denmark | 1993 | 67 |
| Triumph | France | 1992 | 90 |

EXAMPLE 11

Isolation and purification of Cereal-LTP from wheat flour

Pure Wheat-LTP1 was isolated from 30 kg wheat flour by extraction with 270 l water at pH 7.8 for 4 h. The mixture was left overnight at 4° C. to permit insoluble material to precipitate. 195 l of the supernatant was concentrated by ultrafiltration to 6.9 l and residual flour was removed by centrifugation. Ammonium sulfate was added to 80% saturation and after 16 h at 4° C. the resultant suspension was centrifuged. One quarter of the precipitate was dissolved in 400 ml water and dialyzed in a Spectra/por® dialysis membrane (cutoff 3,500 Dalton) against water. The dialysate (1 l) was centrifuged, adjusted to pH 6.5 and subjected to ion exchange chromatography using a column of S-Sepharose Fast Flow (5 cm×15 cm, 300 ml) equilibrated in 20 mM Mes, pH 6.5. Wheat-LTP1 was eluted by applying a gradient of NaCl (0 to 0.1M) in the same buffer. Fractions containing a 10 kDa component were identified by SDS-PAGE using a Phast-System from Pharmacia, pooled and concentrated in vacuum at 35° C. using a rotary-evaporator. The components in the concentrated sample were separated by gel filtration on Sephadex G50 in a column (2.5 cm×67 cm, 330 ml) equilibrated with 20 mM NaAc, 0.1M NaCl, pH 4.9. A peak containing a 10 kD protein was identified by SDS-PAGE and N-terminal amino acid sequencing, revealing the sequence Ile-Asp-*-Gly-His-Val-Asp-Ser-Leu-Val-, where the star denotes a blank position corresponding to the Cys found at this position in wheat-LTP1, confirmed that this component was pure wheat-LTP1. The preparation was dialyzed in a Spectra/por® dialysis membrane (cutoff 3500 Dalton) and lyophilized.

EXAMPLE 12

Addition of wheat-LTP1 during the preparation of wort

The effect of addition of wheat-LTP1 during the wort boiling step was investigated using the model system described in Example 8. Pure wheat-LTP (obtained as described in Example 11) (0.5 mg/ml) and/or hop extract (61 mg α-acid/l) was added when boiling was initiated. The resulting foam potentials appear from Table VI.

TABLE VI

| Without added LTP | Foam Potential (ml/ml) | Addition of LTP (0.5 mg/ml) | Foam Potential (ml/ml) |
|---|---|---|---|
| Wort boiled without hops | 1.01 ± 0.04 | LTP added to wort before boiling without hops | 1.76 ± 0.07 |
| Wort boiled with hops | 1.65 ± 0.05 | LTP added to wort before boiling with hops | 2.28 ± 0.08 |

EXAMPLE 13

Influence of boiling on foaming potential barley- and wheat-LTP1

Barley- or wheat-LTP1 (0.5 mg/ml) obtained as described in Examples 1b and 11, respectively, was dissolved in 20 mM Mes (2-(N-morpholino)ethane sulfonic acid), pH 5.5. 2% ethanol (with or without 2.5 mg/ml trilinolein) was added while sonicating. Hop extract was added to a final concentration of 61 mg α-acid/l as indicated in Table VII and the mixture was boiled for 90 minutes as described in Example 8. Foam measurements were performed after addition of HMW fraction (2.5 µg/ml) obtained as described in Example 2.

TABLE VII

| | Boiling | Additives | Foam potential |
|---|---|---|---|
| Barley-LTP1 | — | — | 0.78 ± 0.02 |
| | 90 min | — | 0.61 ± 0.03 |
| | 90 min | hops | 1.40 ± 0.05 |
| | 90 min | hops + trilineolin | 1.92 ± 0.05 |
| Wheat-LTP1 | — | — | 0.80 ± 0.04 |
| | 90 min | — | 1.02 ± 0.03 |
| | 90 min | hops | 1.85 ± 0.06 |
| | 90 min | hops + trilineolin | 1.83 ± 0.07 |

REFERENCES

1) Anderson, F. B. & Harris, G.: Nitrogenous constituents of brewing materials. XII. Foam-stabilizing substances in beer. J. Inst. Brew. 69:383–388 (1963).
2) Asano, K. & Hashimoto, N.: Isolation and characterization of foaming proteins of beer. J. Am. Soc. Brew. Chem. 38:129–137 (1980).
3) Bernhard, W. R. & Sommerville, C. R.: Coidentity of putative amylase inhibitors from barley and finger millet with phospholipid transfer proteins inferred from amino acid sequence hormology. Arch. Biochem. Biophys. 269:695–697 (1989).
4) Bishop, L. R.: Haze- and foam-forming substances in beer. J. Inst. Brew. 81:444–449 (1975).
5) Bradford, M. M.: A rapid and sensitive method for the quantitation of microgram quantities of protein utilizing the principle of protein-dye binding. Anal. Biochem. 72:248–254 (1976).
6) Dale, C. J. & Young, T. W.: Low molecular weight nitrogenous components and their influence on the stability of beer foam. J. Inst. Brew. 98:123–127 (1992).
7) Dubois, M., Gilles, K. A., Hamilton, J. K. Rebers, P. A. & Smith, F.: Colorimetric method for determination of sugars and related substances. Anal. Chem. 28, 350–356 (1956).
8) Haugsted, C. & Erdal, K.: Head hunting. Proc. Eur. Brew. Conv., 23rd Congress. Lisbon 1991. p. 449–456.

9) Haugsted, C.; Pedersen, M. B. & Erdal, K.: An optoelectrical foam assay system. Monatsschr. Brauwissenschaft 43:336–339 (1990).
10) Hejgaard, J. & Sorensen, S. B.: Characterization of a protein-rich beer fraction by two-dimensional immunoelectrophoretic techniques. Compt. Rend. Trav. Lab. Carlsberg 40:187–203 (1975).
11) Hollemans, M. & Tonies, A. R. J. M.: The role of specific proteins in beer foam. Proc. Eur. Brew. Conv., 22nd Congress. Zurich 1989. p. 561–568.
12) Mohan, S. B., Smith, L., Kemp, W. & Lyddiatt, A.: An immunochemical analysis of beer foam. J. Inst. Brew. 98:187–192 (1992).
13) Molina, A., Segura, A. & Garcia-Olmedo, F.: Lipid transfer proteins (nsLTPs) from barley and maize leaves are potent inhibitors of bacterial and fungal plant pathogens. FEBS Letters 316:119–122 (1993).
14) Mundy, J. & Rogers, J. C.: Selective expression of a probable amylase/protease inhibitor in barley aleurone cells: Comparison to the barley amylase/subtilisin inhibitor. Planta 169:51–63 (1986).
15) Sharpe, F. R., Jacques, D., Rowsell, A. G. & Whitear, A. L.: Rapid methods of measuring the foam-active nitrogenous components of worts and beers. Proc. Eur. Brew. Conv., 18th Congress Copenhagen 1981. p. 607–614 (1981).
16) Skriver, K., Leah, R., Muller-Uri, F., Olsen, F.-L. & Mundy, J.: Structure and expression of the barley lipid transfer protein gene Ltp1. Plant. Mol. Biol. 18:585–589 (1992).
17) Slack, P. T. & Bamforth, C. W.: The fractionation of polypeptides from barley and beer by hydrophobic interaction chromatography: The influence of their hydrophobicity on foam stability. J. Inst. Brew. 89:397–401 (1983).
18) Svensson, B., Asano, K., Jonassen, I., Poulsen, F. M., Mundy, J. & Svendsen, I.: A 10 kD barley seed protein homologous with an α-amylase inhibitor from indian finger millet. Carlsberg Res. Commun. 51:493–500 (1986).
19) Whitear, A. L.: Basic factors that determine foam stability. The Institute of Brewing. Australia and New Zealand Section. Proc. 15th Conv. New Zealand 1978. p. 67–75.
20) Yokoi, S., Maeda, K., Xiao, R., Kamada, K. & Kamimura, M.: Characterization of beer proteins responsible for the foam of beer. Proc. Eur. Brew. Conv. 22nd Congress. Zürich 1989. p. 503–512 (1989).
21) Hallgren, L., Rosendal, I. and Rasmussen, J. N.: Experiences with a new foam stability analyzer, System Carlsberg J. Am. Soc. Brew. Chem. 49:78–86 (1991).
22) Rasmussen, J. N.: Automated analysis of foam stability. Carlsberg Res. Commun 46:25–36, (1981).
23) P. Vaag: The Enzyme-Linked Immunosorbent Assay (ELISA) in the Beverage Industries: Principles and Practice. In Analysis of Nonalcoholic Beverages. Modern Methods of Plant Analysis, vol. 8 (Eds. Linskens, H. F. and Jackson, J. F.), Springer-Verlag, Berlin 1988.

We claim:

1. In a beer formed from raw materials, including at least one variety of cereal selected from a group of cereal varieties from which congress wort can be formed having a cereal lipid transfer protein content of between 61–140 μg/ml, the improvement wherein the raw materials comprise a refined material that comprises a foam enhancer selected from the group consisting of (a) a member of the cereal lipid transfer protein family; (b) a modified cereal lipid transfer protein fraction obtained by treating the member of (a) by heating, boiling, mashing or a combination thereof in water at a pH between 3 and 7; and (c) mixtures thereof; said refined material having a higher cereal lipid transfer protein content than is present in any of said cereal varieties and being present in the beer in an amount sufficient to provide the beer with an enhanced foam potential as compared with the foam potential provided to the beer by the raw materials without the refined material.

2. A non-beer beverage comprising a foam enhancer selected from the group consisting of (a) a member of the cereal lipid transfer protein family for enhancing the foam potential of the beverage; (b) a modified cereal lipid transfer protein fraction obtained by treating the member of (a) by heating, boiling, mashing or a combination thereof in water at a pH between 3 and 7, and (c) mixtures thereof.

3. A beverage according to claim 2, wherein the member of (a) is a barley lipid transfer protein.

4. A beverage according to claim 2, wherein the beverage is fermented.

5. A beverage according to claim 2, wherein the concentration of the foam enhancer in the beverage is at least 25 μg/ml.

6. A beverage according to claim 2, further comprising cereal storage proteins and fragments thereof having preserved foam stabilizing and foam forming properties.

7. A beverage according to claim 2, further comprising albumins.

8. A beverage according to claim 2, further comprising carbohydrates.

9. A beverage according to claim 2, further comprising lipids.

10. A beverage according to claim 4, wherein the concentration of the foam enhancer in the beverage is at least 100 μg/ml.

11. A beverage according to claim 8, further comprising fatty acids.

12. A method for producing a protein/peptide containing non-beer beverage comprising the step of adding to the beverage a foam enhancer selected from the group consisting of (a) a member of the cereal lipid transfer protein family for enhancing the foam potential of the beverage; (b) a modified cereal lipid transfer protein fraction obtained by treating the member of (a) by heating, boiling, mashing or a combination thereof in water at a pH between 3 and 7; and (c) mixtures thereof.

13. A beer comprising a foam enhancer selected from the group consisting of (a) a member of the cereal lipid transfer protein family; (b) a modified cereal lipid transfer protein fraction obtained by treating the member of (a) by heating, boiling, mashing or a combination thereof in water at a pH between 3 and 7; and (c) mixtures thereof; said beer being produced from cereal lipid transfer protein containing raw materials and water in respective amounts by a process comprising the steps of formation of a wort from the raw materials with subsequent fermentation of the wort and clarifying and finishing of the fermented wort, said foam enhancer being present in the raw materials or a portion of said foam enhancer being present in the raw materials with addition of the foam enhancer being incorporated into the beer before, during or after boiling of the wort, the foam enhancer being present in the beer in a concentration greater than in a beer produced by said process from water and reference raw materials in said respective amounts wherein the reference raw materials have a cereal lipid transfer protein content that is necessary and sufficient to make a congress wort having a cereal lipid transfer protein content of 125 μg/ml.

14. A beer according to claim 13, wherein the member of (a) is a barley lipid transfer protein.

15. A beer according to claim 13, further comprising cereal storage proteins and fragments thereof having preserved foam stabilizing and foam forming properties.

16. A beer according to claim 13, further comprising albumins.

17. A beer according to claim 13, further comprising carbohydrates.

18. A beer according to claim 13, further comprising lipids.

19. A beer according to claim 13, further comprising hop components.

20. A beer according to claim 13, wherein the foam enhancer is present in the beer in a concentration greater than in a beer produced by said process from water and the reference raw materials in said respective amounts wherein the reference raw materials have a cereal lipid transfer protein content that is necessary and sufficient to make a congress wort having a cereal lipid transfer protein content of 150 μg/ml.

21. A beer according to claim 18, further comprising fatty acids.

22. A method for producing a beer from respective amounts of water and cereal lipid transfer protein containing raw materials comprising the steps of formation of a wort from the raw materials with subsequent fermentation of the wort and clarifying and finishing of the fermented wort, said beer comprising a foam enhancer selected from the group consisting of (a) a member of the cereal lipid transfer protein family; (b) a modified cereal lipid transfer protein fraction obtained by treating the member of (a) by heating, boiling, mashing or a combination thereof in water at a pH between 3 and 7; and (d) mixtures thereof; said foam enhancer being present in the raw materials or a portion of said foam enhancer being present in the raw materials with additional of the foam enhancer being incorporated into the beer before, during or after boiling of the wort, said foam enhancer being present in the beer in a concentration greater than in a beer produced by said method from water and reference raw materials in said respective amounts wherein the reference raw materials have a cereal lipid transfer protein content that is necessary and sufficient to make a congress wort having a cereal lipid transfer protein content of 125 µg/ml.

23. A method according to claim 22, comprising a mashing step, said foam enhancer being added before the mashing step.

24. A method according to claim 22, comprising a boiling step, said foam enhancer being added before the boiling step.

25. A method according to claim 22, wherein the foam enhancer comprises barley lipid transfer protein 1 comprising SEQ ID NOS: 1, 2 and 3.

26. A method according to claim 22, wherein the foam enhancer is added as an at least partly soluble additive.

27. A method according to claim 22, wherein the foam enhancer is added in an amount of at least 25 µg/ml of the beer.

28. A method according to claim 22, comprising the steps of
  i) preparing malt or malt extract,
  ii) preparing wort,
  iii) fermenting the wort,
  iv) clarifying and finishing the beer,
said foam enhancer being added before or in one or more of the steps i), ii), iii) and iv).

29. A method according to claim 28, wherein the foam enhancer is added in or before step ii).

30. A method according to claim 22, wherein said foam enhancer is present in the beer in a concentration greater than in a beer produced by said method from water and the reference raw materials in said respective amounts wherein the reference raw materials have a cereal lipid transfer protein content that is necessary and sufficient to make a congress wort having a cereal lipid transfer protein content of 150 µg/ml.

31. A method according to claim 22, wherein the foam enhancer is added in an amount of at least 100 µg/ml beer.

32. A beer comprising a foam enhancer selected from the group consisting of (a) a cereal lipid transfer protein comprising an amino acid sequence selected from the group consisting of SEQ ID NOS: 1–12; (b) a modified cereal lipid transfer protein fraction obtained by treating the cereal lipid transfer protein of (a) by heating, boiling, mashing or a combination thereof in water at a pH between 3 and 7; and (c) mixtures thereof; said beer being produced from cereal lipid transfer protein containing raw materials and water in respective amounts by a process comprising the steps of formation of a wort from the raw materials with subsequent fermentation of the wort and clarifying and finishing of the fermented wort, said foam enhancer being present in the raw materials or a portion of said foam enhancer being present in the raw materials with addition of the foam enhancer being incorporated into the beer before, during or after boiling of the wort, the foam enhancer being present in the beer in a concentration greater than in a beer produced by said process from water and reference raw materials in said respective amounts wherein the reference raw materials have a cereal lipid transfer protein content that is necessary and sufficient to make a congress wort having a cereal lipid transfer protein content of 125 µg/ml.

33. A beer according to claim 32, wherein the foam enhancer is present in the beer in a concentration greater than in a beer produced from water and the reference raw materials in said respective amounts wherein the reference raw materials have a cereal lipid transfer protein content that is necessary and sufficient to make a congress wort having a cereal lipid transfer protein content of 150 µg/ml.

34. A method for producing a beer from respective amounts of water and cereal lipid transfer protein containing raw materials comprising the steps of formation of a wort from the raw materials with subsequent fermentation of the wort and clarifying and finishing of the fermented wort, said beer comprising a foam enhancer selected from the group consisting of (a) a cereal lipid transfer protein comprising an amino acid sequence selected from the group consisting of SEQ ID NOS: 1–12; (b) a modified cereal lipid transfer protein fraction obtained by treating the cereal lipid transfer protein of (a) by heating, boiling, mashing or a combination thereof in water at a pH between 3 and 7; and (c) mixtures thereof; said foam enhancer being present in the raw materials or a portion of said foam enhancer being incorporated into the beer before, during or after boiling of the wort, said foam enhancer being present in the beer in a concentration greater than in a beer produced by said method from water and reference raw materials in said respective amounts wherein the reference raw materials have a cereal lipid transfer protein content that is necessary and sufficient to mare a congress wort having a cereal lipid transfer protein content of 125 µm.

35. A method according to claim 34 wherein the foam enhancer is present in the beer in a concentration greater than in a beer produced by said method from water and the reference raw materials in said respective amounts wherein the reference raw materials have a cereal lipid transfer protein that is necessary and sufficient to make a congress wort having a cereal lipid transfer protein content of 150 µm/ml.

36. In a beer formed by processing raw materials naturally containing proteinaceous components, including a cereal lipid transfer protein content, by a process involving treating the raw materials by mashing, filtration and boiling to form a wort and thereafter fermenting the wort and clarifying and finishing the fermented wort, the improvement wherein the beer comprises a foam enhancer selected from the group consisting of (a) a member of the cereal lipid transfer protein family; (b) a modified cereal lipid transfer protein fraction obtained by treating the member of (a) by heating, boiling, mashing or a combination thereof in water at a pH between 3 and 7; and (c) mixtures thereof; said foam enhancer being present in the raw materials or being incorporated into the beer before, during or after boiling of the wort, said foam enhancer being selected and being present in the beer in an amount sufficient to provide the beer With an enhanced foam potential as compared with the foam potential provided to the beer by raw materials having a cereal lipid transfer protein content that is necessary to obtain a congress wort with a cereal LTP content of 125 μm/ml.

37. A beer according to claim 36, wherein said foam enhancer is selected and is present in the beer in an amount sufficient to provide the beer with an enhanced foam potential as compared with the foam potential provided to the beer by raw materials having a cereal lipid transfer protein content that is necessary to obtain a congress wort with a cereal LTP content of 150 μm/ml.

38. A beer comprising a foam enhancer selected from the group consisting of (a) a member of the cereal lipid transfer protein family; (b) a modified cereal lipid transfer protein fraction obtained by treating the member of (a) by heating, boiling, mashing or a combination thereof in water at a pH between 3 and 7; and (c) mixtures thereof, wherein the beer is produced from lipid transfer protein containing raw materials by a process consisting essentially of formation of a wort from the raw materials with subsequent fermentation of the wort and clarifying and finishing of the fermented wort, said foam enhancer being present in the raw materials or a portion of said foam enhancer being present in the raw materials with additional of the foam enhancer being incorporated into the beer before, during or after boiling of the wort, the foam enhancer being present in the beer in a concentration at least as great as in a beer produced by said process from a raw material having a lipid transfer protein content that is necessary and sufficient to make a congress wort having a cereal LTP content of 125 μg/ml.

* * * * *

```
                        SEQUENCE LISTING (1) GENERAL INFORMATION:

(iii) NUMBER OF SEQUENCES: 41

(2) INFORMATION FOR SEQ ID NO:1:

(i) SEQUENCE CHARACTERISTICS:
        (A) LENGTH:        17 Amino Acids
        (B) TYPE:          Amino Acids
        (D) TOPOLOGY:      Linear (xi) SEQUENCE DESCRIPTION:    SEQ ID NO:1:

Leu Asn Cys Gly Gln Val Asp Ser Lys Met Lys Pro Cys Leu Thr
 1               5                  10                  15

Tyr Val (2) INFORMATION FOR SEQ ID NO:2:

(i) SEQUENCE CHARACTERISTICS:
        (A) LENGTH:        33 Amino Acids
        (B) TYPE:          Amino Acids
        (D) TOPOLOGY:      Linear (xi) SEQUENCE DESCRIPTION:    SEQ ID NO:2:

Gln Gly Gly Pro Gly Pro Ser Gly Glu Cys Cys Asn Gly Val Arg
 1               5                  10                  15

Asp Leu His Asn Gln Ala Gln Ser Ser Gly Asp Arg Gln Thr Val
                20                  25                  30

Cys Leu Cys (2) INFORMATION FOR SEQ ID NO:3:

(i) SEQUENCE CHARACTERISTICS:
```

```
        (A) LENGTH:        41 Amino Acids
        (B) TYPE:          Amino Acids
        (D) TOPOLOGY:      Linear (xi) SEQUENCE DESCRIPTION:    SEQ ID NO:3:

Leu Lys Gly Ile Ala Arg Gly Ile His Asn Leu Asn Leu Asn Asn
 1               5                  10                  15

Ala Ala Ser Ile Pro Ser Lys Cys Asn Val Asn Val Pro Tyr Thr
                20                  25                  30

Ile Ser Pro Asp Ile Asp Cys Ser Arg Ile Tyr
                35                  40

(2) INFORMATION FOR SEQ ID NO:4:

(i) SEQUENCE CHARACTERISTICS:
        (A) LENGTH:        17 Amino Acids
        (B) TYPE:          Amino Acids
        (D) TOPOLOGY:      Linear (xi) SEQUENCE DESCRIPTION:    SEQ ID NO:4:

Ile Asp Cys Gly His Val Asp Ser Leu Val Arg Pro Cys Leu Ser
 1               5                  10                  15

Tyr Val (2) INFORMATION FOR SEQ ID NO:5:

(i) SEQUENCE CHARACTERISTICS:
        (A) LENGTH:        33 Amino Acids
        (B) TYPE:          Amino Acids
        (D) TOPOLOGY:      Linear (xi) SEQUENCE DESCRIPTION:    SEQ ID NO:5:

Gln Gly Gly Pro Gly Pro Ser Gly Gln Cys Cys Asp Gly Val Lys
 1               5                  10                  15

Asn Leu His Asn Gln Ala Arg Ser Gln Ser Asp Arg Gln Ser Ala
                20                  25                  30

Cys Asn Cys (2) INFORMATION FOR SEQ ID NO:6:

(i) SEQUENCE CHARACTERISTICS:
        (A) LENGTH:        40 Amino Acids
        (B) TYPE:          Amino Acids
        (D) TOPOLOGY:      Linear (xi) SEQUENCE DESCRIPTION:    SEQ ID NO:6:

Leu Lys Gly Ile Ala Arg Gly Ile His Asn Leu Asn Glu Asp Asn
 1               5                  10                  15

Ala Arg Ser Ile Pro Pro Lys Cys Gly Val Asn Leu Pro Tyr Thr
                20                  25                  30

Ile Ser Leu Asn Ile Asp Cys Ser Arg Val
                35                  40

(2) INFORMATION FOR SEQ ID NO:7:

(i) SEQUENCE CHARACTERISTICS:
        (A) LENGTH:        18 Amino Acids
        (B) TYPE:          Amino Acids
        (D) TOPOLOGY:      Linear (xi) SEQUENCE DESCRIPTION:    SEQ ID NO:7:

Ala Leu Ser Cys Gly Gln Val Ala Ser Ala Ile Ala Pro Cys Ile
 1               5                  10                  15
```

Ser Tyr Ala (2) INFORMATION FOR SEQ ID NO:8:

(i) SEQUENCE CHARACTERISTICS:
        (A) LENGTH:     34 Amino Acids
        (B) TYPE:       Amino Acids
        (D) TOPOLOGY:   Linear (xi) SEQUENCE DESCRIPTION:   SEQ ID NO:8:

Arg Gly Gln Gly Ser Gly Pro Ser Ala Gly Cys Cys Ser Gly Val
1               5                 10              15

Arg Ser Leu Asn Asn Ala Ala Arg Thr Thr Ala Asp Arg Ala
             20               25             30

Ala Cys Asn Cys (2) INFORMATION FOR SEQ ID NO:9:

(i) SEQUENCE CHARACTERISTICS:
        (A) LENGTH:     41 Amino Acids
        (B) TYPE:       Amino Acids
        (D) TOPOLOGY:   Linear (xi) SEQUENCE DESCRIPTION:   SEQ ID NO:9:

Leu Lys Asn Ala Ala Ala Gly Val Ser Gly Leu Asn Ala Gly Asn
1               5                 10              15

Ala Ala Ser Ile Pro Ser Lys Cys Gly Val Ser Ile Pro Tyr Thr
             20               25             30

Ile Ser Thr Ser Thr Asp Cys Ser Arg Val Asn
             35               40

(2) INFORMATION FOR SEQ ID NO:10:

(i) SEQUENCE CHARACTERISTICS:
        (A) LENGTH:     17 Amino Acids
        (B) TYPE:       Amino Acids
        (D) TOPOLOGY:   Linear (xi) SEQUENCE DESCRIPTION:   SEQ ID NO:10:

Ile Thr Cys Gly Gln Val Asn Ser Ala Val Gly Pro Cys Leu Thr
1               5                 10              15

Tyr Ala (2) INFORMATION FOR SEQ ID NO:11:

(i) SEQUENCE CHARACTERISTICS:
        (A) LENGTH:     31 Amino Acids
        (B) TYPE:       Amino Acids
        (D) TOPOLOGY:   Linear (xi) SEQUENCE DESCRIPTION:   SEQ ID NO:11:

Gly Ala Gly Pro Ser Ala Ala Cys Cys Ser Gly Val Arg Ser Leu
1               5                 10              15

Lys Ala Ala Ala Ser Thr Thr Ala Asp Arg Arg Thr Ala Cys Asn
             20               25             30

Cys (2) INFORMATION FOR SEQ ID NO:12:

(i) SEQUENCE CHARACTERISTICS:
        (A) LENGTH:     41 Amino Acids
        (B) TYPE:       Amino Acids
        (D) TOPOLOGY:   Linear (xi) SEQUENCE DESCRIPTION: SEQ ID NO:12:

Leu Lys Asn Ala Ala Arg Gly Ile Lys Gly Leu Asn Ala Gly Asn
 1               5                  10                  15

Ala Ala Ser Ile Pro Ser Lys Cys Gly Val Ser Val Pro Tyr Thr
                20                  25                  30

Ile Ser Ala Ser Ile Asp Cys Ser Arg Val Ser
                35                  40

(2) INFORMATION FOR SEQ ID NO:13:

(i) SEQUENCE CHARACTERISTICS:
        (A) LENGTH:     18 Amino Acids
        (B) TYPE:       Amino Acids
        (D) TOPOLOGY:   Linear (xi) SEQUENCE DESCRIPTION: SEQ ID NO:13:

Ala Ile Ser Cys Gly Gln Val Ser Ser Ala Ile Gly Pro Cys Leu
 1               5                  10                  15

Ala Tyr Ala (2) INFORMATION FOR SEQ ID NO:14:

(i) SEQUENCE CHARACTERISTICS:
        (A) LENGTH:     77 Amino Acids
        (B) TYPE:       Amino Acids
        (D) TOPOLOGY:   Linear (xi) SEQUENCE DESCRIPTION: SEQ ID NO:14:

Arg Gly Ala Gly Ala Ala Pro Ser Ala Ser Cys Gln Ser Gly Val
 1               5                  10                  15

Arg Ser Leu Asn Ala Ala Ala Arg Thr Thr Ala Asp Arg Arg Ala
                20                  25                  30

Ala Cys Asn Cys Ser Leu Lys Ser Ala Ala Ser Arg Val Ser Gly
                35                  40                  45

Leu Asn Ala Gly Lys Ala Ser Ser Ile Pro Gly Arg Cys Gly Val
                50                  55                  60

Arg Leu Pro Tyr Ala Ile Ser Ala Ser Ile Asp Cys Ser Arg Val
                65                  70                  75

Asn Asn (2) INFORMATION FOR SEQ ID NO:15:

(i) SEQUENCE CHARACTERISTICS:
        (A) LENGTH:     18 Amino Acids
        (B) TYPE:       Amino Acids
        (D) TOPOLOGY:   Linear (xi) SEQUENCE DESCRIPTION: SEQ ID NO:15:

Ala Ile Thr Cys Gly Gln Val Ser Ser Ala Leu Gly Pro Cys Ala
 1               5                  10                  15

Ala Tyr Ala (2) INFORMATION FOR SEQ ID NO:16:

(i) SEQUENCE CHARACTERISTICS:
        (A) LENGTH:     34 Amino Acids
        (B) TYPE:       Amino Acids
        (D) TOPOLOGY:   Linear (xi) SEQUENCE DESCRIPTION: SEQ ID NO:16:

Lys Gly Ser Gly Thr Ser Pro Ser Ala Gly Cys Cys Ser Gly Val
 1               5                  10                  15

```
Lys Arg Leu Ala Gly Leu Ala Arg Ser Thr Ala Asp Lys Gln Ala
            20                  25                  30

Thr Cys Arg Cys (2) INFORMATION FOR SEQ ID NO:17:

(i) SEQUENCE CHARACTERISTICS:
        (A) LENGTH:       8 Amino Acids
        (B) TYPE:         Amino Acids
        (D) TOPOLOGY:     Linear (xi) SEQUENCE DESCRIPTION:   SEQ ID NO:17:

Leu Lys Ser Val Ala Gly Ala Tyr
                5

(2) INFORMATION FOR SEQ ID NO:18:

(i) SEQUENCE CHARACTERISTICS:
        (A) LENGTH:       30 Amino Acids
        (B) TYPE:         Amino Acids
        (D) TOPOLOGY:     Linear (xi) SEQUENCE DESCRIPTION:   SEQ ID NO:18:

Asn Ala Gly Arg Ala Ala Gly Ile Pro Ser Arg Cys Gly Val Ser
 1               5                  10                  15

Val Pro Tyr Thr Ile Ser Ala Ser Val Asp Cys Ser Lys Ile His
            20                  25                  30

(2) INFORMATION FOR SEQ ID NO:19:

(i) SEQUENCE CHARACTERISTICS:
        (A) LENGTH:       18 Amino Acids
        (B) TYPE:         Amino Acids
        (D) TOPOLOGY:     Linear (xi) SEQUENCE DESCRIPTION:   SEQ ID NO:19:

Ala Ile Ser Cys Gly Gln Val Ser Ser Ala Leu Ser Pro Cys Ile
                5                   10                  15

Ser Tyr Ala (2) INFORMATION FOR SEQ ID NO:20:

(i) SEQUENCE CHARACTERISTICS:
        (A) LENGTH:       34 Amino Acids
        (B) TYPE:         Amino Acids
        (D) TOPOLOGY:     Linear (xi) SEQUENCE DESCRIPTION:   SEQ ID NO:20:

Arg Gly Asn Gly Ala Lys Pro Pro Ala Ala Cys Cys Ser Gly Val
 1               5                  10                  15

Lys Arg Leu Ala Gly Ala Ala Gln Ser Thr Ala Asp Lys Gln Ala
            20                  25                  30

Ala Cys Lys Cys (2) INFORMATION FOR SEQ ID NO:21:

(i) SEQUENCE CHARACTERISTICS:
        (A) LENGTH:       8 Amino Acids
        (B) TYPE:         Amino Acids
        (D) TOPOLOGY:     Linear (xi) SEQUENCE DESCRIPTION:   SEQ ID NO:21:

Ile Lys Ser Ala Ala Gly Gly Leu
 1               5
```

(2) INFORMATION FOR SEQ ID NO:22:

(i) SEQUENCE CHARACTERISTICS:
        (A) LENGTH:       30 Amino Acids
        (B) TYPE:         Amino Acids
        (D) TOPOLOGY:     Linear (xi) SEQUENCE DESCRIPTION:    SEQ ID NO:22:

```
Asn Ala Gly Lys Ala Ala Gly Ile Pro Ser Met Cys Gly Val Ser
 1               5                  10                  15

Val Pro Tyr Ala Ile Ser Ala Ser Val Asp Cys Ser Lys Ile Arg
                20                  25                  30
```

(2) INFORMATION FOR SEQ ID NO:23:

(i) SEQUENCE CHARACTERISTICS:
        (A) LENGTH:       17 Amino Acids
        (B) TYPE:         Amino Acids
        (D) TOPOLOGY:     Linear (xi) SEQUENCE DESCRIPTION:    SEQ ID NO:23:

```
Val Asp Cys Gly Gln Val Asn Ser Ser Leu Ala Ser Cys Ile Pro
 1               5                  10                  15

Phe Leu
```

(2) INFORMATION FOR SEQ ID NO:24:

(i) SEQUENCE CHARACTERISTICS:
        (A) LENGTH:       34 Amino Acids
        (B) TYPE:         Amino Acids
        (D) TOPOLOGY:     Linear (xi) SEQUENCE DESCRIPTION:    SEQ ID NO:24:

```
Thr Gly Gly Val Ala Ser Pro Ser Ala Ser Cys Cys Ala Gly Val
 1               5                  10                  15

Gln Asn Leu Lys Thr Leu Ala Pro Thr Ser Ala Asp Arg Arg Ala
                20                  25                  30

Ala Cys Glu Cys
```

(2) INFORMATION FOR SEQ ID NO:25:

(i) SEQUENCE CHARACTERISTICS:
        (A) LENGTH:       41 Amino Acids
        (B) TYPE:         Amino Acids
        (D) TOPOLOGY:     Linear (xi) SEQUENCE DESCRIPTION:    SEQ ID NO:25:

```
Ile Lys Ala Ala Ala Ala Arg Phe Pro Thr Ile Lys Gln Asp Ala
 1               5                  10                  15

Ala Ser Ser Leu Pro Lys Lys Cys Gly Val Asp Ile Asn Ile Pro
                20                  25                  30

Ile Ser Lys Thr Thr Asn Cys Gln Ala Ile Asn
                35                  40
```

(2) INFORMATION FOR SEQ ID NO:26:

(i) SEQUENCE CHARACTERISTICS:
        (A) LENGTH:       17 Amino Acids
        (B) TYPE:         Amino Acids
        (D) TOPOLOGY:     Linear (xi) SEQUENCE DESCRIPTION:    SEQ ID NO:26:

```
Val Asn Cys Gly Gln Val Asn Lys Ala Leu Ser Ser Cys Val Pro
```

```
            1               5              10              15
Phe Leu (2) INFORMATION FOR SEQ ID NO:27:

(i) SEQUENCE CHARACTERISTICS:
        (A) LENGTH:        34 Amino Acids
        (B) TYPE:          Amino Acids
        (D) TOPOLOGY:      Linear (xi) SEQUENCE DESCRIPTION:   SEQ ID NO:27:

Thr Gly Phe Asp Thr Thr Pro Ser Leu Thr Cys Cys Ala Gly Val
 1               5                      10                 15

Met Leu Leu Lys Arg Leu Ala Pro Thr Val Lys Asp Lys Arg Ile
                20                  25                     30

Ala Cys Glu Cys (2) INFORMATION FOR SEQ ID NO:28:

(i) SEQUENCE CHARACTERISTICS:
        (A) LENGTH:        41 Amino Acids
        (B) TYPE:          Amino Acids
        (D) TOPOLOGY:      Linear (xi) SEQUENCE DESCRIPTION:   SEQ ID NO:28:

Val Lys Thr Ala Ala Ala Arg Tyr Pro Asn Ile Arg Glu Asp Ala
 1               5                      10                 15

Ala Ser Ser Leu Pro Tyr Lys Cys Gly Val Val Ile Asn Val Pro
                20                  25                     30

Ile Ser Lys Thr Thr Asn Cys His Glu Ile Asn
                35                  40

(2) INFORMATION FOR SEQ ID NO:29:

(i) SEQUENCE CHARACTERISTICS:
        (A) LENGTH:        18 Amino Acids
        (B) TYPE:          Amino Acids
        (D) TOPOLOGY:      Linear (xi) SEQUENCE DESCRIPTION:   SEQ ID NO:29:

Ala Val Pro Cys Ser Thr Val Asp Met Lys Ala Ala Ala Cys Val
 1               5                      10                 15

Gly Phe Ala (2) INFORMATION FOR SEQ ID NO:30:

(i) SEQUENCE CHARACTERISTICS:
        (A) LENGTH:        34 Amino Acids
        (B) TYPE:          Amino Acids
        (D) TOPOLOGY:      Linear (xi) SEQUENCE DESCRIPTION:   SEQ ID NO:30:

Thr Gly Lys Asp Ser Lys Pro Ser Gln Ala Cys Cys Thr Gly Leu
 1               5                      10                 15

Gln Gln Leu Ala Gln Thr Val Lys Thr Val Asp Asp Lys Lys Ala
                20                  25                     30

Ile Cys Arg Cys (2) INFORMATION FOR SEQ ID NO:31:

(i) SEQUENCE CHARACTERISTICS:
        (A) LENGTH:        38 Amino Acids
        (B) TYPE:          Amino Acids
```

(D) TOPOLOGY: Linear (xi) SEQUENCE DESCRIPTION: SEQ ID NO:31:

Ala Ser Ser Lys Ser Leu Gly Ile Lys Asp Gln Phe Leu Ser Lys
1               5                   10                  15

Ile Pro Ala Ala Cys Asn Ile Lys Val Gly Phe Pro Val Ser Thr
                20                  25                  30

Asn Thr Asn Cys Glu Thr Ile His
                35

(2) INFORMATION FOR SEQ ID NO:32:

(i) SEQUENCE CHARACTERISTICS:
        (A) LENGTH: 18 Amino Acids
        (B) TYPE: Amino Acids
        (D) TOPOLOGY: Linear (xi) SEQUENCE DESCRIPTION: SEQ ID NO:32:

Ala Leu Thr Cys Gly Gln Val Thr Ala Gly Leu Ala Pro Cys Leu
1               5                   10                  15

Pro Tyr Leu (2) INFORMATION FOR SEQ ID NO:33:

(i) SEQUENCE CHARACTERISTICS:
        (A) LENGTH: 5 Amino Acids
        (B) TYPE: Amino Acids
        (D) TOPOLOGY: Linear (xi) SEQUENCE DESCRIPTION: SEQ ID NO:33:

Gln Gly Arg Gly Pro
1               5

(2) INFORMATION FOR SEQ ID NO:34:

(i) SEQUENCE CHARACTERISTICS:
        (A) LENGTH: 27 Amino Acids
        (B) TYPE: Amino Acids
        (D) TOPOLOGY: Linear (xi) SEQUENCE DESCRIPTION: SEQ ID NO:34:

Leu Gly Gly Cys Cys Gly Gly Val Lys Asn Leu Leu Gly Ser Ala
                5                   10                  15

Lys Thr Thr Ala Asp Arg Lys Thr Ala Cys Thr Cys
                20                  25

(2) INFORMATION FOR SEQ ID NO:35:

(i) SEQUENCE CHARACTERISTICS:
        (A) LENGTH: 41 Amino Acids
        (B) TYPE: Amino Acids
        (D) TOPOLOGY: Linear (xi) SEQUENCE DESCRIPTION: SEQ ID NO:35:

Leu Lys Ser Ala Ala Asn Ala Ile Lys Gly Ile Asp Leu Asn Lys
1               5                   10                  15

Ala Ala Gly Ile Pro Ser Val Cys Lys Val Asn Ile Pro Tyr Lys
                20                  25                  30

Ile Ser Pro Ser Thr Asp Cys Ser Thr Val Gln
                35                  40

(2) INFORMATION FOR SEQ ID NO:36:

(i) SEQUENCE CHARACTERISTICS:

```
            (A) LENGTH:          18 Amino Acids
            (B) TYPE:            Amino Acids
            (D) TOPOLOGY:        Linear (xi) SEQUENCE DESCRIPTION:   SEQ ID NO:36:

Gly Ile Thr Cys Gly Met Val Ser Ser Lys Leu Ala Pro Cys Ile
 1               5                  10                  15

Gly Tyr Leu (2) INFORMATION FOR SEQ ID NO:37:

(i) SEQUENCE CHARACTERISTICS:
            (A) LENGTH:          4 Amino Acids
            (B) TYPE:            Amino Acids
            (D) TOPOLOGY:        Linear (xi) SEQUENCE DESCRIPTION:   SEQ ID NO:37:

Lys Gly Gly Pro (2) INFORMATION FOR SEQ ID NO:38:

(i) SEQUENCE CHARACTERISTICS:
            (A) LENGTH:          28 Amino Acids
            (B) TYPE:            Amino Acids
            (D) TOPOLOGY:        Linear (xi) SEQUENCE DESCRIPTION:   SEQ ID NO:38:

Leu Gly Gly Gly Cys Cys Gly Gly Ile Lys Ala Leu Asn Ala Ala
 1               5                  10                  15

Ala Ala Thr Thr Pro Asp Arg Lys Thr Ala Cys Asn Cys
                20                  25

(2) INFORMATION FOR SEQ ID NO:39:

(i) SEQUENCE CHARACTERISTICS:
            (A) LENGTH:          41 Amino Acids
            (B) TYPE:            Amino Acids
            (D) TOPOLOGY:        Linear (xi) SEQUENCE DESCRIPTION:   SEQ ID NO:39:

Leu Lys Ser Ala Ala Asn Ala Ile Lys Gly Ile Asn Tyr Gly Lys
 1               5                  10                  15

Ala Ala Gly Leu Pro Gly Met Cys Gly Val His Ile Pro Tyr Ala
                20                  25                  30

Ile Ser Pro Ser Thr Asn Cys Asn Ala Val His
                35                  40

(2) INFORMATION FOR SEQ ID NO:40:

(i) SEQUENCE CHARACTERISTICS:
            (A) LENGTH:          53 Amino Acids
            (B) TYPE:            Amino Acids
            (D) TOPOLOGY:        Linear (xi) SEQUENCE DESCRIPTION:   SEQ ID NO:40:

Val Leu Thr Cys Gly Gln Val Thr Gly Ala Leu Ala Pro Cys Leu
 1               5                  10                  15

Gly Tyr Leu Ser Arg Gln Val Asn Val Pro Val Pro Leu Thr Cys
                20                  25                  30

Cys Asn Val Val Arg Gly Leu Asn Asn Ala Ala Arg Thr Thr Leu
                35                  40                  45

Asp Lys Arg Thr Ala Cys Gly Cys
                50
```

```
(2) INFORMATION FOR SEQ ID NO:41:

(i) SEQUENCE CHARACTERISTICS:
        (A) LENGTH:       41 Amino Acids
        (B) TYPE:         Amino Acids
        (D) TOPOLOGY:     Linear (xi) SEQUENCE DESCRIPTION:    SEQ ID NO:41:

Leu Lys Gln Thr Ala Asn Ala Val Thr Gly Leu Asn Leu Asn Ala
 1               5                  10                  15

Ala Ala Gly Leu Pro Ala Arg Cys Gly Val Asn Ile Pro Tyr Lys
                20                  25                  30

Ile Ser Pro Thr Thr Asp Cys Asn Arg Val Val
                35                  40
```